US010409583B2

(12) United States Patent
Sreenivasa et al.

(10) Patent No.: US 10,409,583 B2
(45) Date of Patent: Sep. 10, 2019

(54) CONTENT DEPLOYMENT SYSTEM HAVING A CONTENT PUBLISHING ENGINE WITH A FILTER MODULE FOR SELECTIVELY EXTRACTING CONTENT ITEMS PROVIDED FROM CONTENT SOURCES FOR INTEGRATION INTO A SPECIFIC RELEASE AND METHODS FOR IMPLEMENTING THE SAME

(71) Applicant: salesforce.com, inc., San Francisco, CA (US)

(72) Inventors: Abhishek Bangalore Sreenivasa, Hayward, CA (US); Adam Torman, Walnut Creek, CA (US); Tyler Montgomery, Lodi, CA (US); Douglas Bitting, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/823,093

(22) Filed: Nov. 27, 2017

(65) Prior Publication Data
US 2019/0163459 A1 May 30, 2019

(51) Int. Cl.
*G06F 9/44* (2018.01)
*G06F 8/65* (2018.01)
*G06F 9/54* (2006.01)

(52) U.S. Cl.
CPC ............. *G06F 8/65* (2013.01); *G06F 9/547* (2013.01)

(58) Field of Classification Search
CPC ........................................................ G06F 8/65
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |

(Continued)

OTHER PUBLICATIONS

Screenivasa, Abhishek B., U.S. Appl. No. 15/455,433 entitled "Release Management in a Content Management System," filed Mar. 20, 2017.

*Primary Examiner* — Hang Pan
(74) *Attorney, Agent, or Firm* — Lorenz & Kopf, LLP

(57) ABSTRACT

Content deployment systems and methods are provided for integrating and deploying selected content items as part of a specific release. A content publishing engine includes a processor that can execute a release management API that is configured to manage and store a manifest record that specifies release items by API name that are allowed to be part of the specific release. The processor is configured to execute a bulk API that is configured to receive content package objects from a plurality of content sources. For example, the first content source can directly invoke the bulk API to send first content items to the content publishing engine. A filter module can extract selected first content items that are specified in the manifest record for inclusion in the specific release, and add the selected first content items into a release object so that they are included as part of the specific release.

20 Claims, 11 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0182652 A1* | 9/2003 | Custodio ................ G06F 8/61 717/122 |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0163266 A1* | 7/2008 | Schmidt ................ G06F 8/71 719/328 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0265219 A1* | 10/2009 | Zaccagnino ....... G06Q 20/1235 705/7.29 |
| 2010/0318967 A1* | 12/2010 | Bhatia ................ G06F 8/65 717/122 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

(56) References Cited

U.S. PATENT DOCUMENTS

2013/0283263 A1* 10/2013 Elemary ............. G06F 9/45558
                                                        718/1
2014/0282399 A1*  9/2014 Gorelik ................ G06F 8/71
                                                        717/122
2015/0269130 A1*  9/2015 Huber .................. G06F 9/451
                                                        715/234

* cited by examiner

CONTENT DEPLOYMENT SYSTEM HAVING A CONTENT PUBLISHING ENGINE WITH A FILTER MODULE FOR SELECTIVELY EXTRACTING CONTENT ITEMS PROVIDED FROM CONTENT SOURCES FOR INTEGRATION INTO A SPECIFIC RELEASE AND METHODS FOR IMPLEMENTING THE SAME

TECHNICAL FIELD

Embodiments of the subject matter described herein relate generally to content release management and publishing in a content deployment system. More particularly, embodiments of the subject matter relate to a content deployment system having a content publishing engine with a filter module for selectively extracting content items provided from content sources for integration into a specific release and publication as part of the specific release, and related methods for implementing the same.

BACKGROUND

A web content publishing process can involve many different activities including content creation, content editing, copyediting, content retirement, and release management across many different types of content.

Release management can be complex and time-consuming activity. In a conventional release management environment, releasing content to a platform includes significant involvement of many individual contributors.

Individual content contributors can come from many different backgrounds. For instance, some contributors may belong to an engineering team, whereas other contributors may be part of a marketing team, while still other contributors may be part of other teams that generate content. As part of the process of releasing new content, the platform might have to be re-written to incorporate the new content, e.g., overwriting various database tables and blob stores with a completely new version of the platform. This can cause design challenges that lead to errors and/or inconsistencies that might only be avoided through excessive coordination between many types of teams.

In addition, various decisions and coordination need to occur during this highly complex release management process. For example, a conventional release management process can require a significant amount of supervision and approval by one or more release managers who are tasked with deciding which content items are integrated into a specific version of a release. To explain further, a release manager is responsible for planning many different releases, and has control over the content items or objects that will be included in and published as part of a specific release. This involves a time-consuming set of tasks. For instance, a release manager has to decide the metadata tagging for filtering content (e.g. role, product, skill), determine the content that should be added or removed or retired, determine pointers to multiple version control systems and repositories or branches where the content is mastered, and resolve other issues on a detailed content basis. These are just some of the challenges faced in a release management process.

Consequently, employee resources can be wasted because of the inefficient allocation of employee time needed to ensure a new release from a content deployment system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
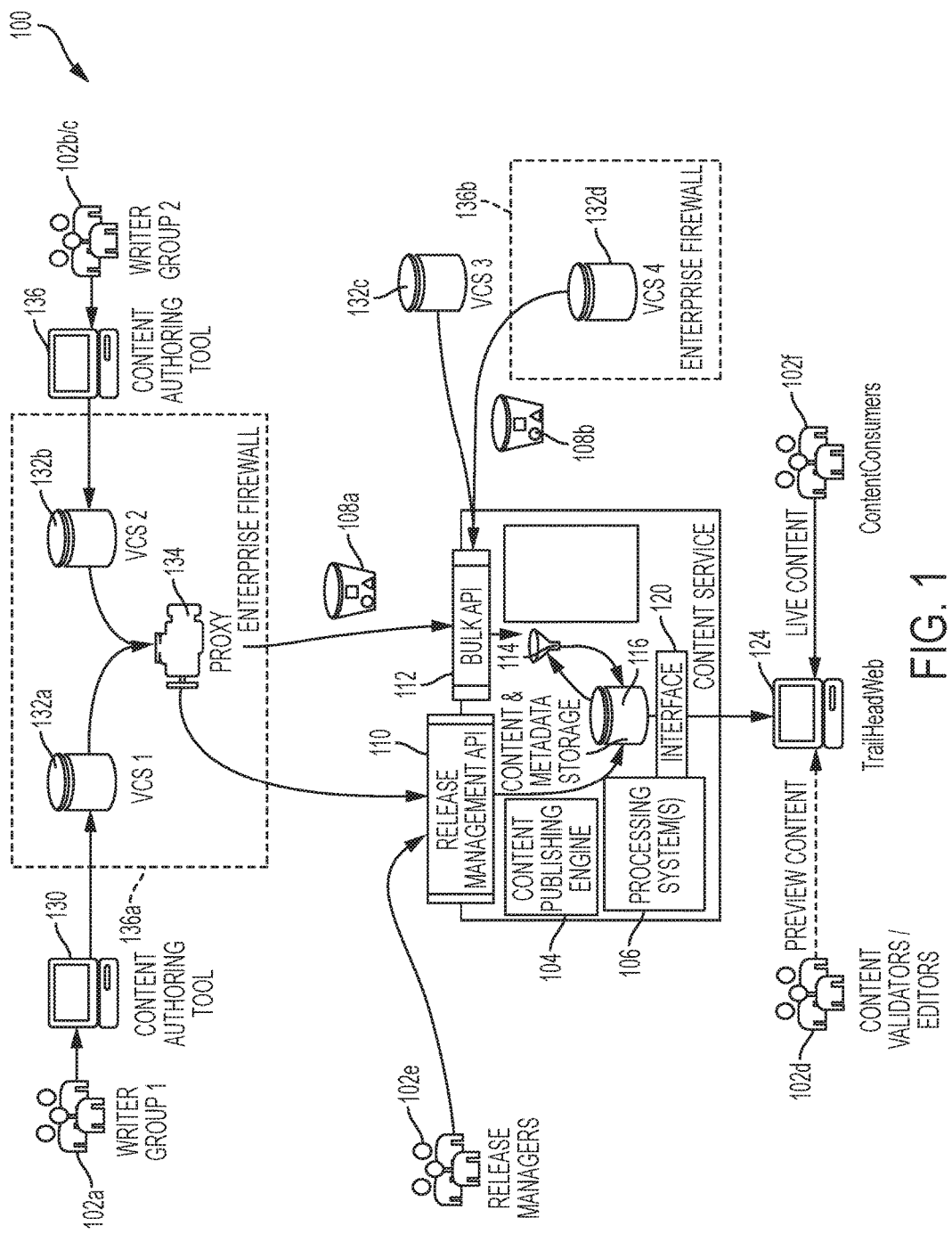
FIG. 1 is a schematic block diagram of an example of a content deployment system in which features of the disclosed embodiments can be implemented in accordance with the disclosed embodiments.

In current content deployment systems that are used to publish content, the content that is published in a particular release can come from multiple sources (e.g., version control systems). A particular release can include many different pieces of content (also referred to as content items) coming from many different content creators (e.g., writers). A particular release can include of many different pieces of content coming from different version control systems. The different content creators can create content using a variety of different tools, and then store the content in a wide variety of different version control systems. Formats of the content and the version control systems used to store and manage the content can vary considerably (e.g., XML, Markdown, HTML, JSON, DITA, ASCII, YML, or any combination thereof, etc.). A content publishing system has to pull content items from all of these different sources (e.g., version control systems), and then it must be determined which content items are appropriate for integration into a particular release. These issues, among others, can make the process of content deployment/publishing and release management highly complex, difficult, time consuming, and not scalable.

It would be desirable to provide content deployment systems and methods that can automatically obtain content items from a variety of different sources (e.g., different version control system and manage integration of those content items into a specific release that is to be published as part of a complex content deployment process.

Some of the disclosed implementations of systems, apparatus, methods and computer program products are for facilitating release management in a content deployment system or environment. For example, rather than interacting with an engineering team to release content, release managers, e.g., users without programming experience, can modify content directly through the platform. Instead of writing new and original code to publish their content, users can modify and/or approve content through easy-to-use tools, implemented with various application programming interfaces (API). For example, if a release manager would like to edit an object, e.g., "Visualforce 101," instead of coordinating with an engineer to implement the edit, the release manager can navigate to the appropriate webpage, select the Visualforce 101 module object, and make the changes through an easy to use interface that makes the changes in near real-time, which can be previewed through user selection of a "Preview" button. Consequently, the process of releasing new content can be better streamlined without inefficient use employee resources.

In addition, to address the issues discussed above, content deployment methods, systems, procedures and technology are provided for integrating and deploying selected content items into a specific release as part of the specific release. The content deployment system includes a plurality of content sources and a content publishing engine that is configured to control the release of content items that are to be published. Each of the content sources can manage or store content items for potential inclusion in the specific release. For example, a first content source is configured to manage and store a plurality of first content items for potential inclusion in the specific release.

In one embodiment, the content publishing engine includes a processor, a filter module and storage. The processor is configured to execute a release management API that is configured to manage and store a manifest record for the specific release. The manifest record specifies release items by API name that are allowed to be part of the specific release.

The processor is configured to execute a bulk API that is configured to receive content package objects from the plurality of content sources. For example, the first content source can directly invoke the bulk API to send the plurality of first content items to the content publishing engine. For instance, the first content source can push the first content package object to the bulk API of the content publishing engine.

In accordance with the disclosed embodiments, the filter module can process the first content items to extract selected first content items from the plurality of first content items. The selected first content items are ones of the first content items that are specified in the manifest record for inclusion in the specific release. The filter module can add the selected first content items into a release object so that the selected first content items are included as part of the specific release. The filter module can automatically add the selected first content items into the release object without requiring a release manager to determine which ones of the first content items will be included as part of the specific release. The filter module rejects any content items that are not specified in the manifest record such that those rejected content items are not included in the release object for the specific release and can not published at runtime.

In one embodiment, a release manager can define, in the manifest record, an API name for each release item that is allowed to be included as part of the specific release. Writers can also specify each content item by an API name that serves as an identifier and indicates content type. The content items having an API name that matches an API name of a release item defined in the manifest record are permitted to be part of the specific release. For example, in the example above, the selected first content items included in the first content package object by the content source are the first content items that each have an API name that matches an API name of a release item defined in the manifest record. The selected first content items are included in a release object for the specific release, whereas others of the plurality of first content items included in the first content package object by the content source each have an API name that that does not match an API name of a release item defined in the manifest record and therefore are not included in the release object for the specific release. Each of the selected first content items can be integrated into one of the release items defined in the manifest record.

The storage can store content items created by writers, and other information such as metadata that describes the content and interactive activities as objects. The processor of the content publishing engine can add the release object into the storage. During the preview mode, the processor can allow previewing of release items of the release object. At runtime, the processor can publish the release items for access by any content consumers. The preview mode occurs prior to runtime and publishing, and during preview mode, a first set of actions are permitted with respect to the release items. By contrast, during a publish-and-release mode, a second set of actions are permitted with respect to the release items that are different than the first set of actions.

In one embodiment, the plurality of content sources can also include a second content source that is configured to manage and store a plurality of second content items for potential inclusion in the specific release, and a third content source that is configured to manage and store a plurality of third content items for potential inclusion in the specific release. In one embodiment, a proxy is also provided. The proxy can be, for example, associated with an enterprise database system. The proxy can periodically request the manifest record for the specific release from the release management API. The proxy can then periodically retrieve, from the second content source based on the manifest record, selected second content items that are specified in the manifest record for inclusion in the specific release, and periodically retrieve, from the third content source, selected ones the plurality of third content items that are specified in the manifest record for inclusion in the specific release. The proxy can compile the selected second content items and the selected third content items into a second content package object, and push the second content package object to the bulk API to allow for continuous integration of the selected second content items and the selected third content items into the specific release.

In one embodiment, the plurality of content sources can also include a fourth content source. The fourth content source can: manage and store a plurality of fourth content items for potential inclusion in the specific release, and directly invoke the bulk API to send the plurality of fourth content items to the content publishing engine. Access to the fourth content items stored at the fourth content source is secured by another enterprise firewall. The filter module can process the fourth content items to extract selected fourth content items that are specified in the manifest record for inclusion in the specific release from the plurality of fourth content items, and add the selected fourth content items into the release object so that the selected fourth content items are included as part of the specific release.

In one embodiment, a user interface can be displayed at a user system (e.g., of a release manager) for interacting with each manifest record. The user interface includes a plurality of configurable settings comprising: a remove setting that is configurable to remove release items from the manifest record for the specific release so that any removed release item will no longer be included as part of that specific release; a modify setting that is configurable to change properties of a release object or a particular release item of the release object that is associated with a specific manifest record; a move setting that is configurable to specify a manifest record and a particular release item, wherein changing the manifest record of the move setting moves a release item of the manifest record from the specific release to another manifest record of another specific release that is open in the same namespace; and a retire setting that is configurable to retire any release item from the specific release so that any retired release item remains in the manifest record as part of the specific release and is hidden from view when published at run time.

In one embodiment, the release object comprises a plurality of release items, and the release management API can store, for each release item in the specific release, reference information comprising: build status information that indicates when that release item was last successfully released. The reference information can also include any errors associated with that release item when that release item was not successfully released.

FIG. 1 is a schematic block diagram of an example of a content deployment system 100 in which features of the disclosed embodiments can be implemented in accordance with the disclosed embodiments. The content deployment system 100 includes a variety of different hardware and/or software components that are in communication with each other. In the non-limiting example of FIG. 1, content deployment system 100 includes a content publishing engine 104 that hosts a content publishing service, various user systems including user systems 130, 136 that are used to interact with content authoring tools to create and develop content (e.g., content items), a user system 124 for previewing content before publication and/or viewing published content after publication, various version control systems 132 that store, manage and maintain content items created by various users, a proxy 134, and enterprise firewalls 136. All of the various elements collectively provide a content generating environment for creating content, and a content deployment system having automated release management capability for integrating appropriate content items into various releases, and then publishing those releases so that they may be accessed and viewed by users.

As shown in FIG. 1, an exemplary content deployment system 100 can include a content publishing engine 104 that operates in conjunction with a number of version control systems 132 to manage the release and publishing of content that is provided from a number of different content sources, which in the embodiment of FIG. 1, are a variety of different version control systems 132, but could also be other sources such as a local file system, a database application, a cloud storage system, a file hosting service such as Dropbox™ or Google Drive™, etc. Content generated by various writers is stored and maintained at the different version control systems 132 as content items. Writers can be located at different sites and work simultaneously on updates to a content item.

As used herein, a "content item" can refer to a set of directions for a content service to apply in rendering a webpage or piece of actual content that is rendered on a webpage. In general, a content item can include resources and/or assets, where a resource can refer to text, markup (e.g., HTML, XML or other markup languages), or other configuration, and an asset can refer to anything embedded within a resource that is not text, markup, or other configuration (e.g., video, audio, images, sounds, other presentational features, etc.). As such, a content item can include text, HTML, CSS, metadata, video, audio, images, animated images (GIFs), etc. In this regard, Hypertext Markup Language (HTML) can be used to express a set of directions how to render webpage, images can provide a set of directions of assets to show on the page, assessments (JavaScript Object Notation (JSON)) can provide directions for how to interact and validate skills on a webpage or web application, and metadata can be a set of directions related to how to filter or provide a skills graph mapping for the content as well as the structural relationships between things (e.g., structural relationships between things like trails and modules, etc.). In this context, metadata can include things such as classifications (e.g., products, roles, and tags), relationships between objects, titles, descriptions, badge icons as well as a separate category for assessment directions.

These content items can be packaged together and provided to the content publishing engine 104 in content package objects via a network (not illustrated). As used herein, the term "content package object" refers to a container for a set of content items that are packaged together as an object. For example, a content package object may be a file, such as a .zip file, that serves as a container for a set of content items (e.g., html, images, metadata, and assessments). A content package object can be used as a delivery mechanism for transporting a set of content items to a content service.

Content package objects can include one or more content items (e.g., data associated with a content object) that can come from one or more sources (e.g., from one or more VCSs 132). Content items each have a unique identifier that can be used to uniquely identify a particular content item that is part of a content package object. In addition, in some embodiments, after identifying a content item, a level of an organizational hierarchy (or content object hierarchy) can be determined for the identified content item. Levels of hierarchies may be represented in a variety of ways, for instance, an ascending numerical scale, e.g., 1-5; a descending numerical scale, e.g., 5-1; an alphabetical scale, e.g., a-z; etc. In other implementations, a first level may be determined in relation to another level. For example, if two content items are identified as part of a content package object, a server can determine that the first content item, e.g., path object, is higher in the organizational hierarchy than the second content item, e.g., module object.

In one non-limiting implementation, the content items can include, e.g., unit objects, module objects, path objects (or trails), or other content items. In some implementations, a module object can be a series of sequential unit objects associated with a particular subject area. Once all the unit objects in a module object are complete, a user may receive a badge that will be displayed on a user's enterprise platform profile. In some implementations, a unit object takes a user through several learning objectives for features, tools, or best practices related to a topic, e.g., database system administration. Unit objects can conclude with a challenge that reinforces a learning objective. A challenge can be an interactive exercise to test a user's knowledge of a unit object. If a user completes a challenge, the user can earn points that are added to a user's platform profile. Module objects can be a collection of unit objects, and path objects can be a collection of module objects. Similarly, in some implementations, a path object can be a series of module objects, organized in a guided learning path to assist a user in learning different aspects of an enterprise learning environment.

The content publishing engine 104 can selectively publish the various content items as part of different releases. Depending on the context, a "release" can refer to an event, or can refer to a container for release items. This container is also referred to herein as a release object. A "release object" can refer to a container of release items for inclusion in a specific release. A "release item" can refer to a logical collection of content items that are allowed or permitted for inclusion in a specific release. Each release item is also a logical collection of some of the content items that are allowed or permitted for inclusion in a specific release. A release is built for consumption by an audience (e.g., a specific targeted private audience, or a public audience to which content is freely or publicly available). Release items can be published so that they can be accessed and viewed by any number of user systems 124, 128, 130, 136, such as desktops, laptops, tablets, smartphones or other client devices, Google Glass™, and any other computing device implemented in an automobile, aircraft, television, or other business or consumer electronic device or system, including web clients.

A release object is specific for a given version of a release and can be include many different content items from many different sources of content (e.g., content items extracted from many different content package objects). A release object can control and/or track information, for instance, version, release object name, release object description, created by, created date, last modified, target release date, actual release date, permissions, security parameters, etc. Each release object can have different states such as open, closed, pending (or review), or published. Each release item that is part of the particular release object can have different states such as upsert of archived. In some implementations, a release object can be generated using API requests. In one example, release objects interact through public and/or private APIs to add, update, or otherwise modify content. The content might include a new unit object and an update to an existing object. A series of API requests can be executed to organize content. A variety of different API requests can be used to handle content package objects and release objects.

For example, a create object request, a delete object request, an update object request, an execute search request, a get object metadata request, a version request, or a custom API request. In some implementations, the processing of a series of API requests is asynchronous, which can allow for an uninterrupted customer experience as changes are being made. For example, after content package objects are received by bulk API 112, bulk API 112 of the content publishing engine 104 may begin processing the content, or may delay the start of processing the content (e.g., delay the start of processing to avoid a data conflict). For example, if content received concerns an update to an object that is already in the process of being updated, then the bulk API 112 will delay the more recent update until completing the earlier update. If bulk API 112 were to process the more recent update at the same time, the updates could create a conflict that renders the object inoperable until an administrator manually corrects the conflict Users FIG. 1 also illustrates a number of different users 102. Users 102a-102f can include different users corresponding to a variety of roles and/or permissions. Examples of users include a first group of content writers 102a (e.g., one or more business users), a second group of content writers 102b/c (e.g., one or more technical users 102b or other users 102c who generate content), at least one content validator or content editor 102d (also referred to as validation users or editors), at least one release management user 102e (also referred to herein a release manager), and at least one content consumer 102f (e.g., a user). In some implementations, release management can include releasing new content (created by one or more of users 102a-102e via user systems 124, 130, 136) to a user system 124 of the enterprise platform. Examples of devices used by users 102a-102f include, but are not limited to a desktop computer or portable electronic device such as a smartphone, a tablet, a laptop, a wearable device such as Google Glass®, another optical head-mounted display (OHMD) device, a smart watch, etc.

Users 102a-102e can use content authoring tools to create content (also be referred to as content items herein) that is for potential inclusion in a release. Content can include a variety of files created manually by a user through a variety of word processors, source code editors, or other integrated development environments (Sublime Text, VIM, Emacs, etc.).

Version Control Systems

A version control system can refer to a system that automatically tracks and manages changes to collections of information such as content items. Each version control system can allow multiple writers to contribute to the development of a content item, and track the changes made by each writer. For example, a version control system can identify each change to a content item, and associate each change with a timestamp and a person/entity that made the change. Revisions to a content item can be compared, restored, and with some types of files, merged. As groups of writers contribute to a content item it is common for multiple versions of the same content item to be created for potential inclusion in a release of that content item. The changes to a content item can be stored as files in a repository of the version control system.

Each version control system 132 capable of storing and managing content items submitted by any number of users (e.g., content writers). Each version control system 132 can be implemented using separate physical and/or virtual database server hardware that communicates, either directly, or indirectly via a proxy 134, with the content publishing engine 104 to perform the various functions described herein. Among other things, each version control system 132 can receive content items created by a group of one or more users (e.g., content writers who share access and submit content items to a particular version control system 132). Depending on the implementation, the users may share access to any content that is stored at a particular version control system, but in other implementations each users access to particular content items can be secure.

The disclosed embodiments can allow for integration of content items from multiple, different version control systems. In accordance with the disclosed embodiments, the version control systems 132a-132d may be different version control systems. Each of the version control systems can be different in terms of how they are structured and organized, and/or in terms of features, capabilities, user workflow, etc. For example, some VCSs (e.g., GitHub or Perforce) have a branching system, whereas DropBox may not have formalized branches but may be similar in APIs to Box.com. Access controls may be different as well (e.g., Github gives access to repositories, whereas Perforce does by branches). Some are protocol based. For example, Github relies on git which is a different protocol than what is accepted for Perforce.

Multiple version control systems can be utilized to enable more groups within an organization of easily integrate their content into a release regardless of which version control system is used to manage and store content items. In one non-limiting use case, a documentation team may be using a version control system like Perforce for their XML based content, whereas a marketing group may be using an enterprise level version control system like enterprise level Github with their markdown and HTML content. This provides the maximum amount of flexibility without forcing different teams having to give up their existing versioning control systems. While this non-limiting use case refers to version control systems like Perforce and enterprise level Github it should be appreciated that this example is non-limiting and that any number of different version control systems can be implemented within a content deployment systems in accordance with the disclosed embodiments. For example, in other implementations, the can be version control systems such as Relational Clear Case, Subversion, Mercurial, GNU Bazaar, Bitbucket, SourceForge, etc.

In addition, each of the version control systems 132a-132d may or may not use a proxy to facilitate continuous integration of content items into a release object for a specific release. In the non-limiting example that is shown in FIG. 1, the first version control system 132a and the second version control system 132b utilize the proxy 134 to allow for a continuous integration build. However, in other implementations the proxy 134 is not utilized, and the API is invoked directly by the version control systems to submit content items for potential inclusion in a release. For instance, in FIG. 1, the version control systems 132c,d can invoke the API directly. In this implementation, an additional filter module 114 is used at the content publishing engine 104 to ensure that the manifest record is respected. To explain further, the filter module 114 is used when a version control system calls the API directly to ensure that the manifest record is still respected and only specific content items will be admitted to the release.

Further, as will be described in greater detail below, depending on the implementation, each of the version control systems 132a-132d may or may not reside behind a firewall such as firewalls 136a,b.

Content Publishing Engine

The content publishing engine 104 is a server or server system that may be implemented using one or more actual and/or virtual computing systems that collectively provide a dynamic platform for generating and deploying content. For example, the content publishing engine 104 may be implemented using a cluster of actual and/or virtual servers operating in conjunction with each other, typically in association with conventional network communications and other features as appropriate. The content publishing engine 104 operates with any sort of conventional processing hardware 104, such as a processor 106, memory, input/output features and the like. The input/output features generally represent the interface(s) to networks (e.g., Internet, or any other local area, wide area or other network), mass storage, display devices, data entry devices and/or the like. The content publishing engine 104 may control some communication with other components of content deployment system 100. This communication may be facilitated through a combination of networks and interfaces.

The processor 106 may be implemented using any suitable processing system, such as one or more processors, controllers, microprocessors, microcontrollers, processing cores and/or other computing resources spread across any number of distributed or integrated systems, including any number of "cloud-based" or other virtual systems. Memory (not illustrated) of the content publishing engine 104 represents any non-transitory short or long-term storage or other computer-readable media capable of storing programming instructions for execution on the processor 106, including any sort of random access memory (RAM), read only memory (ROM), flash memory, magnetic or optical mass storage, and/or the like. The computer-executable programming instructions, when read and executed by the content publishing engine 104 and/or processor 106, cause the content publishing engine 104 and/or processor 106 to create, generate, or otherwise facilitate performance of one or more additional tasks, operations, functions, and/or processes described herein. It should be noted that the memory represents one suitable implementation of such computer-readable media, and alternatively or additionally, the content publishing engine 104 could receive and cooperate with external computer-readable media that is realized as a portable or mobile component or platform, e.g., a portable hard drive, a USB flash drive, an optical disc, or the like.

The content publishing engine 104 can be implemented using any sort of software application or other data processing engine that manages the release of content, and generates and provide content and/or services to the user systems 124. In a typical embodiment, the content publishing engine 104 gains access to processing resources, communications interfaces and other features of the processing hardware 106 using any sort of conventional or proprietary operating system.

The content publishing engine 104 provides a content publishing service that can be used by a large number of content writers to submit content items for potential inclusion in a release. The content publishing engine 104 receives content package objects (that each include content items provided from the version control systems 132), manages content items that it receives, and processes them to control the release of content that is to be published for access by any number of users (e.g., the content consumers 102d, 102f). As such, the content publishing engine 104 manages and controls the release of content items that are to be published for access by the content consumers. Release items that are part of the specific release are typically generated at run-time by a runtime generator (not illustrated in FIG. 1) and published for access by the content consumers 102d, 102f in accordance with a release schedule specified by a release manager 102e. The release manager 102e is normally a human decision maker, but can be an artificial intelligence module that performs various tasks based on other information (e.g., defines manifest record).

The content publishing engine 104 includes one or more processing systems 106 (also referred to generically as a processor), a release management API 110, a bulk API 112, a filter module 114, production storage 116, and a release preview and process interface 120, and many equivalent embodiments could include different and/or additional features, components or other modules as desired. The release management API 110, the bulk API 112, and the filter module 114 features may be implemented as a separate processes or modules.

The processor 106 can execute various application program interfaces (APIs) including a release management API 110 and a bulk API 112. APIs can refer to a set of routines, protocols, and tools that specify how content items should be integrated into a specific release, for example, when building graphical user interface (GUI) components.

Among other things, the release management API 110 manages and stores a manifest record for each specific release that is defined by a release manager 102e. A "manifest record" can refer to a list of one or more release items that are to be included as part of a specific release. Within particular a manifest record, each release item is identified by a different (or unique) API name. In other words, each manifest record specifies release items by API name that are allowed to be published as part of the specific release. Each manifest record can be created before any content has even been written (e.g., before any content item has been created by a content writer). As will be described below, any content items (described above) having an API name that matches an API name of any release item specified in the manifest record will be part of that specific release. Any content items having an API name that does not match an API name of any release item specified in the manifest record will not be included in that specific release.

In addition, a manifest record can be used to specify other information, such as: the content API Name identifier (e.g. data_leakage), the content type (e.g. trail), the operation (e.g. upsert, archive), last build (e.g. last attempted build of that specific release item regardless of success), last successful build (e.g. last build where the content items were successfully added to the webpage) the content source identifier (e.g. repo id) the content source path (e.g. repo path), or the content source branch (e.g. repo branch), and any actions that may be taken against each release item.

The bulk API 112 of the content publishing engine 104 receives content package objects 108 from various sources including version control systems 132, and processes them as will be described below. The bulk API 112 of the content publishing engine 104 performs bulk processing operations with respect content items that make up each content package object. The Bulk API 112 can be a Simple Object Access Protocol (SOAP) API, XML-Remote Procedure Call (RPC) API, or RESTful API that is optimized for loading or deleting large sets of data. It can be used to query, insert, update, upsert, or delete a large number of content items asynchronously, meaning that it can be submitted and processed later. In many embodiments, less urgent bulk processing can be scheduled to occur as processing resources become available, thereby giving priority to more urgent processing tasks.

The content publishing engine 104 stores, maintains and manages content items that are received via content package objects used to deliver content items to the content publishing engine 104. Content package objects will be described in greater detail below. The content publishing engine 104 can also control, for example, adding, removing, or changing of metadata and/or content items that are stored at storage 116. The content publishing engine 104 also performs release management functions, and as will be described below, the content publishing engine 104 can add any content items that are designated for inclusion in a specific release to one or more release objects for the specific release. Release objects will be described in greater detail below.

API Name Convention

In accordance with the disclosed embodiments, an API name convention is used to create a whitelist of release items that are permitted to be included in a specific release. As noted above, within particular a manifest record, each release item is identified by a different API name such that each release item that is allowed to be published as part of a specific release has a unique API name. As also described above, any content items having an API name that matches an API name of any release item specified in the manifest record for a specific release will be part of that specific release, and any content items having an API name that does not match an API name of any release item specified in the manifest record will not be included in that specific release. Each release item can include one or more content items that have been designated for inclusion in a specific release. This can allow for release items to unify content items that are created across disparate implementations that utilize different version control systems (e.g., GitHub and Perforce). Namespacing is described in greater detail below with reference to FIG. 7.

When a release manager creates a release, the release manager create a manifest record for that specific release. The release manager can specify an API name (or API names) for each release item that will admitted to that release. In other words, each manifest record specifies an API name for each release item that is allowed to be published as part of the specific release for access by users (e.g., content consumers). A manifest record can include a list of one or more release items that can be added to a specific release including some additional attributes such as content type (e.g. top-level items such as Module, Project, Superbadge, Trail). The API name specified is a convention that is adopted by the team (e.g., content writers, editors, and publishers). The API name can be, for example, a string to identify the content item.

Any content items that are permitted to be included in a specific release (as part of a release object) can also be identified by API Name when created. As such, a manifest record provides a content service that is provided by the content publishing engine 104 with a set of directions that can be used to determine how to handle incoming content items and determine whether to include them as part of a specific release.

To explain further, when writers create content items, they also specify an API name for the content items. As long as these two API names match, content created by a writer will be admitted to a specific release. For example, although a writer and release manager specify API names separately, when those API names match, those content items having the matching API name(s) will be built into the release. By providing the ability to specify, by API name, an id and content type, this API name convention provides flexibility in terms of tools used by writers, and enables freedom to create content in any tooling or version control system and have it still work with the release management system. In addition, the disclosed embodiments can also allow content items to be continuously built and submitted by writers, without having to integrate them into each release until the release manager specifies that those content items should be integrated by defining an API name in a manifest record. As such, the disclosed embodiments can provide flexibility across version control systems and processes.

In addition, the disclosed embodiments can address separation of concerns with data and metadata. Writers control the data (e.g. content items), while the release manager 102e controls the metadata (e.g. tags, icons, titles, etc. . . . ). For example, the release manager 102e specifies metadata that describes content (by API name) in the manifest record for inclusion in the specific release. The metadata also controls a variety of actions that may be taken against each release item in the specific release (e.g., archive, removal, branching, etc. . . . ).

Each manifest record can also include retrieval metadata for each of the content items specified in the manifest record. The retrieval metadata may be used by the proxy 134 to retrieve content items from any repository or any branch of the plurality of version control systems 132.

Continuous Integration Using a Proxy

In one embodiment, the content deployment system 100 can continuously integrate and deploy selected content items created by writers 102a, 102b,c into a release object for a specific release. In the example illustrated in FIG. 1, the version control systems 132a,b each manage and store content items created by writers 102a,b using content authoring tools at user systems 130, 136. Some of these content items may be eligible for inclusion in a specific release depending on whether or not they have an API name matching that of a release item that is specified in a manifest record defined by the release manager 102e. In the description that follows, to differentiate between content items provided from the version control systems 132a,b, content items created by the writers 102a and stored at the version control system 132a can be referred to as "first" content items, whereas content items created by the writers 102b,c and stored at the version control system 132b can be referred to as "second" content items.

In this embodiment, the content deployment system 100 uses a proxy 134 to continuously provide content items from version control systems 132a, 132b to the bulk API 112 of the content publishing engine 104. In one embodiment, the proxy 134 can be implemented using a scripting engine that performs a variety of functions.

For example, the proxy 134 can periodically request the manifest record for the specific release from the release management API 110, and periodically retrieve, based on the manifest record, selected content items (e.g., content items that have an API that matches the API name of one of the release items that are specified in the manifest record) from any number of different version control systems 132 that it is authorized to access. For instance, in the example that illustrated in FIG. 1, the proxy 134 can periodically retrieve selected ones of the first content items that for inclusion in the specific release from the version control system 132a, and selected ones of the second content items for inclusion in the specific release from the version control system 132b. As noted above, the manifest record defined by the release manager 102e includes an API name for each release item that is allowed to be included as part of the specific release, and writers specify each content item by an API name that serves as an identifier and indicates content type. Any content items having an API name that matches the API name of one of the release items that are specified in the manifest record are permitted to be part of the specific release.

The proxy 134 can compile the selected ones of the first content items and second content items into content package object 108a, and push it to the bulk API 112 to allow for continuous integration of the selected ones of the first and second content items into the specific release. This allows selected ones of the first content items and second content items to be submitted to the content publishing engine 104 and added to the release object without requiring the release manager 102e to determine which of the first and second content items are to be included as part of the specific release. This can save significant time and resources that would normally be required to determine which content items should be integrated as part of a specific release and makes the integration process more efficient.

The bulk API 112 can determine whether or not filtering (at filter module 114) is needed to process the content package object 108a before integrating the selected ones of the first content items and second content items into a release object. Whether filtering is needed depends on the implementation. For example, in one implementation, the proxy 134 can include an identifier with the content package object 108a that identifies the manifest record that it used to compile the content package object 108a. Upon receiving the content package object 108a, the bulk API 112 can determine whether it includes an identifier, and if so, can determine whether that identifier matches an identifier for the most current manifest record for the specific release. If so, no further verification is necessary and it is not necessary to filter the content items included in the content package object 108a any further since the proxy 134 has already performed this task. As such, all of the content items from the content package object 108a can be integrated into the corresponding release object without performing further filtering at the filter module 114. This is beneficial because it saves processing resources at the content publishing engine 104 and makes the integration process more efficient.

By contrast, when the bulk API 112 determines that the content package object 108a either does not include an identifier, or that the identifier included with the content package object 108a does not match an identifier for the most current manifest record for the specific release, then the content items of the content package object 108a are filtered at the filter module 114 to verify or determine which content items of the content package object 108a should be included in the release object. For example, as part of verification processing, the filter module 114 can inspect each content item to determine whether it has an API name that matches the API name of one of the release items that are specified in the manifest record, and if so, then that content item will be permitted to be part of the specific release and included as part of the release item that has the matching API name. The filter module 114 can reject any of the content items from the content package object 108b that are not specified in the most current manifest record for the specific release so that those content items are not added to the release object for the specific release. For example, the filter module 114 can inspect each content item to determine whether it has an API name that matches the API name of one of the release items that are specified in the manifest record, and any content items that do not have a matching API name will not be included as part of the specific release. All other content items that pass verification by the filter module 114 can be added to the release object for the specific release. This additional filtering can be important, for example, when the version of the manifest record used by the proxy 134 is not up to date (e.g., is not the most current version). In such cases, the additional filtering is needed to help ensure that only the content items that are intended for inclusion in the specific release are added to the release object.

The processor 106 of the content publishing engine 104 can then integrate the selected first and second content items that are to be included as part of a release object for the specific release into specific release items, and add the release object into the storage 116 so that it can be previewed and/or released and published as will be described below. This can involve either creating a new release object or updating an existing release object. As such, a release object can include content items provided from any number of VCSs that meet API naming criteria of release items specified in the manifest record for inclusion in the specific release.

In one embodiment, the proxy 134 can be associated with an entity such as an enterprise database system. In the implementation illustrated in FIG. 1, access to content items stored at the version control systems 132a, 132b is secured by an enterprise firewall 136a. Because proxy 134 is within the enterprise platform and behind the firewall 136a, it can connect to the version control systems 132a, 132b directly and request access to the first content items and second content items, whereas other outside agents cannot go through the firewall 136a to request access to those content items—the request instead needs to call out from behind the firewall to orchestrate the entire process. The proxy 134 can determine which content items are appropriate for inclusion in the content package object 108a, connect to content publishing engine 104 and then push those content items outside the enterprise firewall 136a to the content publishing engine 104 via the content package object 108a. As a result, the flow of content items from the enterprise platform is a one-way data flow that allows content items to be pushed from the version control systems 132a, 132b to the content publishing engine 104 via proxy 134. This provides a measure of security because the version control systems 132a,b are located behind the firewall 136a.

Filter Module

In another embodiment, use of a filter module 114 at the content publishing engine 104 is necessary to ensure that content items submitted are in compliance with the most current version of the manifest record for a specific release. In these implementations, a proxy is not used or available at a version control system, and the version control system simply pushes content items to the content publishing engine 104. In this case, the filter module 114 determines which content items are compliant with the most current version of the manifest record for a specific release. The filter module 114 can inspect each content item to determine whether it has an API name that matches the API name of one of the release items that are specified in the most current version of the manifest record, and if so, then that content item will be permitted to be part of the specific release and included as part of a release item that has the matching API name.

For example, as illustrated in FIG. 1, a version control system 132c can store "third" content items (e.g., created by a third group of writers that are not illustrated in FIG. 1) and a version control system 132d can store "fourth" content items (e.g., created by a fourth group of writers that are not illustrated in FIG. 1). Some of these content items may be eligible for inclusion in the specific release, whereas other content items may not be eligible for inclusion. In this embodiment, the version control systems 132c,d can directly invoke the bulk API 112 to send batches of content items to the content publishing engine 104. These content items can belong to a number of different releases. The filter module 114 of the content publishing engine 104 is tasked with sorting out which content items (submitted by the version control systems 132c,d) belong to each specific release. The filter module 114 processes the third and fourth content items in bulk and uses various manifest records to determine which specific release the content items belong to. For example, filter module 114 can process the third and fourth content items to determine whether they are defined by a specific manifest record for inclusion in a specific release, and extract selected third and fourth content items that comply with that specific manifest record. The selected third and fourth content items that are extracted can then be added into the release object for that specific release. Any other ones of the third and fourth content items that are not defined by that specific manifest record are rejected with an error.

As such, the content publishing engine 104 can reject any content items that are not specified in the manifest record such that those rejected content items are not included in the release object for the specific release (e.g., will not published at runtime).

Storage

The storage 116 of the content publishing engine 104 can include at least one content and metadata storage database 116 for storing information including content items that have been extracted from content package objects, release objects that comprise release items to be published, and associated metadata. For example, the storage 116 stores content items created by writers and metadata that describes the content and interactive activities as objects. The storage 116 may be a repository or other data storage system capable of storing and managing content items submitted from any number of content sources (e.g., version control systems) by any number of content creators. The storage 116 may be implemented using conventional database server hardware. In various embodiments, the storage 116 shares processing hardware 106 with the content publishing engine 104. In other embodiments, the storage 116 is implemented using separate physical and/or virtual database server hardware that communicates with the content publishing engine 104 to perform the various functions described herein. In some embodiments, the storage 116 can be implemented as part of a multi-tenant database system, as described in greater detail below.

As noted above, the manifest record can also be used to specify actions that can be taken against top-level objects. For example, the manifest record can also be used to provide a create, read, update, delete (CRUD) control features. The release manager 102e can also control, via a user interface, certain configurable settings that are used for interacting with each manifest record. Examples of these configurable settings include a modify setting that allows a release manager to modify a release object or a particular release item of a release object, a remove setting that allows the release manager to remove net new release items from a manifest record for one release (and optionally add them to another manifest record for an open release in the future), a move setting that allows the release manager to move release items from one manifest record to another manifest record, and a retire setting that allows the release manager to leave existing release items in the manifest record, but hide them at run time from the content consumer. The modify setting can be configured to change properties of a release object that is associated with a specific manifest record, or to change properties of a particular release item. The remove setting can be configured to remove any release item from the specific release so that release item will no longer be part of that specific release. The move setting can be configured to specify a manifest record and a particular release item, such that changing the manifest record to another manifest record moves any release item of the manifest record from one specific release of another specific release that is open in the same namespace. The retire setting can be configured to retire any release item from a specific release so that any retired release item remains part of the release, but is hidden from view when the web application is published at run time.

Modifying a Release Object

In some cases, a release object can be modified. For example, a modification can change or update a first version of the release object to a second version of the release object. As one example, a manager of a user might review the content of a release object and change the version from a pending version to an approved version. In another example, when user device provides content, a content package object might be generated, and a corresponding release object might be generated immediately after. Also or alternatively, a modification can be caused using one or more API requests, for instance, a modify API request. Prior to processing a modification, the content publishing engine 104 can determine whether a user (e.g., like a content validator or editor 102d) has permission to access and modify to the release object (e.g., identify permissions associated with the employee).

Removing and Moving Release Items Specified in a Manifest Record

Any release item that can be added into a release, can also be removed or pulled from the release prior to publishing/production. In other words, once a release item is associated with a specific release, the release manager 102e can move that release item to a manifest record for another release or to remove that release item from a manifest record for the specific release.

For example, after release items have been added to a manifest record for a particular release, the release manager 102e also has the ability to remove release items from the manifest record for that release. If a release manager removes a release item from the manifest record for the specific release, the content publishing engine 104 will no longer attempt to include that release item in that specific release.

By contrast, if the release manager wants to move a release item from a manifest record for one specific release to another manifest record for another release, the release manager can move it to any other open release that's available in the same namespace that the release manager 102e is responsible for.

Retirement of Release Items Specified in a Manifest Record

In addition, the release manager 102e also has the ability to retire release items from a particular release, by configuring certain settings in the manifest record. When the release manager 102e retires a release item from a particular release, the release item is hidden from view so that it does not appear when the web application is accessed, but still exists in the web application. This feature thus allows the release manager 102e to mark top-level content as retired within the manifest record so that those release items can be effectively hidden from content consumers at run time.

Preview Mode

Writers 102 a,b,c can submit content items that can be built, on a scheduled basis, into a release object so that they can be viewed and interacted with during a preview mode for review and for feedback purposes. Preview mode occurs prior to runtime and publishing. The processor 106 of the content publishing engine 104 can control which users are allowed to preview and interact with content and release items during a preview mode. During the preview mode, certain users are allowed to preview certain release items, and are permitted to take certain actions with respect to the release items. For instance, in the example illustrated in FIG. 1, only some users 102a,b,c,d can access release items in the preview mode (prior to publishing).

During preview mode, different sets of behaviors are permitted than after publishing. For example, users (e.g., writers) can perform actions such as testing and validating metadata and content to allow for validation of user activity without persistence of user activity data (e.g., like the completion or feedback of content or exercises by users).

In some implementations, release objects can control the process of a preview mode also referred to as "preview-to-publish." A content validator 102d may first click on the URL see that content as it would appear in as an approved version on the enterprise platform. In some cases, content validators may be the only users with permission to view the URL and preview the release object, and the URL would be inaccessible to other users. A content validator may then send it to a release manager 102e when were the content validator 102d believes the release is ready for the release manager's approval. Also or alternatively, a release object can include security parameters for a preview presentation. For example, a release object might also include a preview presentation namespace, e.g., "https://trailhead.sfdc.com/Company_A/preview/." This may be provided as a hyperlink to the release object. Users may then select the hyperlink to navigate to a preview presentation corresponding to the release object. For example, a user interface such as a graphical user interface GUI can be displayed on a computing device presenting content and show content objects prior to a new release object being processed. Another updated user interface can also be displayed on a computing device presenting content that shows content objects after a new release object has been processed. The user interface of the user device may display a hyperlink to a preview presentation including content objects as well as new content object. As such, a content validator may first click on the URL in order to see content objects as an approved version. At the same time, while the user is reviewing new content object, other users, e.g., public users, would be presented with user interface that shows the content objects in a published mode. As such, if there were any problems with new content object that needed to be fixed before being published to the public, the public user's experience with the enterprise platform would not be interpreted.

Content publishing engine 104 may handle and process data requests from users 102a-102f of content deployment system 100. For example, content validators 102d and release managers 102e can make changes to one or more release objects and have those changes stored in content database 116. In some implementations, content publishing engine 104 facilitates automatic release of hierarchical content objects using release objects. In some implementations, release objects allow users to modify content, add content, edit and/or update content, update the version of a release object, and preview content. In this regard, it is noted that updates and/or modifications received for a release object may not be visible to a user viewing a live version of the release object until the version is set to an approved version by a user with the appropriate permission.

By contrast, after content is published, it can be consumed by users, but the actions that can be performed by users are more limited, and any user activity interactions are persisted (e.g., being awarded a badge for completing a quiz or challenge).

Publish and Release Mode

The content publishing engine 104 can control which release items are published at runtime. Content associated with each release can be generated at runtime (or on-demand) by the processor 106 of the content publishing engine 104. The runtime content generator (not illustrated) dynamically builds various releases of content as release objects, and publishes those releases at run-time as scheduled. Each release object includes one or more release items, and the runtime content generator causes the release items associated with a particular release to be published as web content that can be served to a browser or other client program associated with a user system.

Content is released and published by the content publishing engine 104 can be retrieved using any sort of personal computer, mobile telephone, tablet or other network-enabled user system 124, 128, 130, 136 on the network. In an exemplary embodiment, the user system 124, 128, 130, 136 includes a display device, such as a monitor, screen, or another conventional electronic display capable of graphically presenting the content that is released and published by the content publishing engine 104. For example, a user can operate a conventional browser application or other client program executed by the user system 124, 128, 130, 136 to view content published by the content publishing engine 104 via the network 145 using a networking protocol, such as the hypertext transport protocol (HTTP) or the like.

Once published at run-time, and the release items are in release mode, all users including content validators and editors 102*d* and content consumers 102*f* of FIG. 1, can access, view and interact with the release items as part of the specific release. For example, content consumers can view, read, listen to, and interact with content via a user system.

User Access to Content Items and Release Items Maintained at Content Publishing Engine In addition, users 102 access and/or permission with respect to content that is stored and maintained at the content publishing engine 104 and the storage database 116 can be restricted. For example, the content publishing engine 104 considers the identity of each user requesting access to content items from content package objects, and release items from release objects, and permits or denies access consistent with access privileges that have been granted to the user that initiated the request for access.

In some implementations, a user of user system, such as user system 124, may have two different authorization identities. This can allow multiple modes of access to content, which can be based on private authorization or public authorization. For example, one authorization identity can be a set of access credentials based on a profile of a CRM computing platform (as described below). The other authorization identity can be a set of access credentials associated with enterprise platform or user system 124. In some implementations, user system 124 can query the set of access credentials from the CRM computing platform and map those credentials and/or permissions with credentials associated with user system 124.

In other implementations, authorization includes two levels of authorization, for instance, functional authorization and record authorization. Functional authorization can include access to bulk API 112 to control the release of release objects, e.g., approval, incomplete, etc. Record authorization can include access to one or more portions of content to be released, e.g., title, name, etc. Record authorization an also control which users can access the content on the enterprise platform, e.g., public view and/or private view.

An authorization service may be used to determine who can build, preview, or publish content. Multiple modes of access to production content can exist, which can be based on private authorization or public authorization. In still other implementations, a secure image service can be used to protect intellectual property, e.g., images and other media. Also, or alternatively, a caching layer can be used for quick access to content, and APIs 110,112 can be used to release content systematically. In some implementations, access to APIs 110,112 can be restricted to an appropriate set of users. Similarly, the ability to generate or update release objects using APIs 110,112 can be restricted. For example, a user with permission to create new content objects would have access to APIs 112. Access might be restricted in a variety of ways. In other examples, access might be restricted according to users who can see new content objects from release objects prior to approval for publication on user system 124, users who can update and/or change content when the release object is in a review version, users who can change the version of a release object.

Maintenance of Reference Information

The release management API 110 can store reference information that for each release item. The reference information can include build status information that indicates when that release item was last successfully released, and any errors associated with that release item when that release item was not successfully released. This allows a user to determine, on a release item basis, when that particular release item was last successfully built, and when the build/release fails, how to troubleshoot/fix the corresponding content item in the version control system. This reference information can be useful, for example, in a continuous integration implementation, where failures can happen on a more frequent basis. A use case for this is for providing a punch list of warnings and errors that can be provided to a content writer.

FIGS. 2-6 are flow charts that illustrates examples of release management and content deployment methods in accordance with the disclosed embodiments. With respect to FIGS. 2-6, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIGS. 2-6 that follows, the content publishing engine 104 (and any components thereof), version control systems 132, and user systems 124, 128, 130,136 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIGS. 2-6, a particular example is described in which a user system performs certain actions by interacting with other elements of the system 100.

Figure 2:
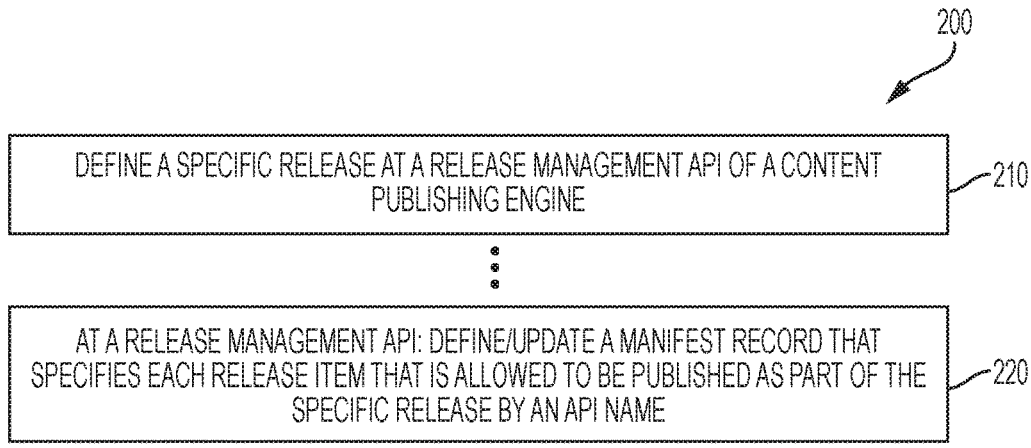
FIG. 2 is a flow chart that illustrates an exemplary method for creating a manifest record in accordance with the disclosed embodiments.

FIG. 2 is a flow chart that illustrates an exemplary method 200 for creating a manifest record in accordance with the disclosed embodiments. The method 200 will be described below with continued reference to FIG. 2. At 210, based on input from a release manager 102e for a specific namespace, a specific release (e.g., a release record for a specific version of a particular release) is created at a release management API 110 of a content publishing engine 104. At 220, based on other input from the release manager 102e, a manifest record is defined at the release management API 110. The manifest record specifies release items, by API name, that are allowed to be published as part of the specific release for access by users (e.g., content consumers).

Figure 3:
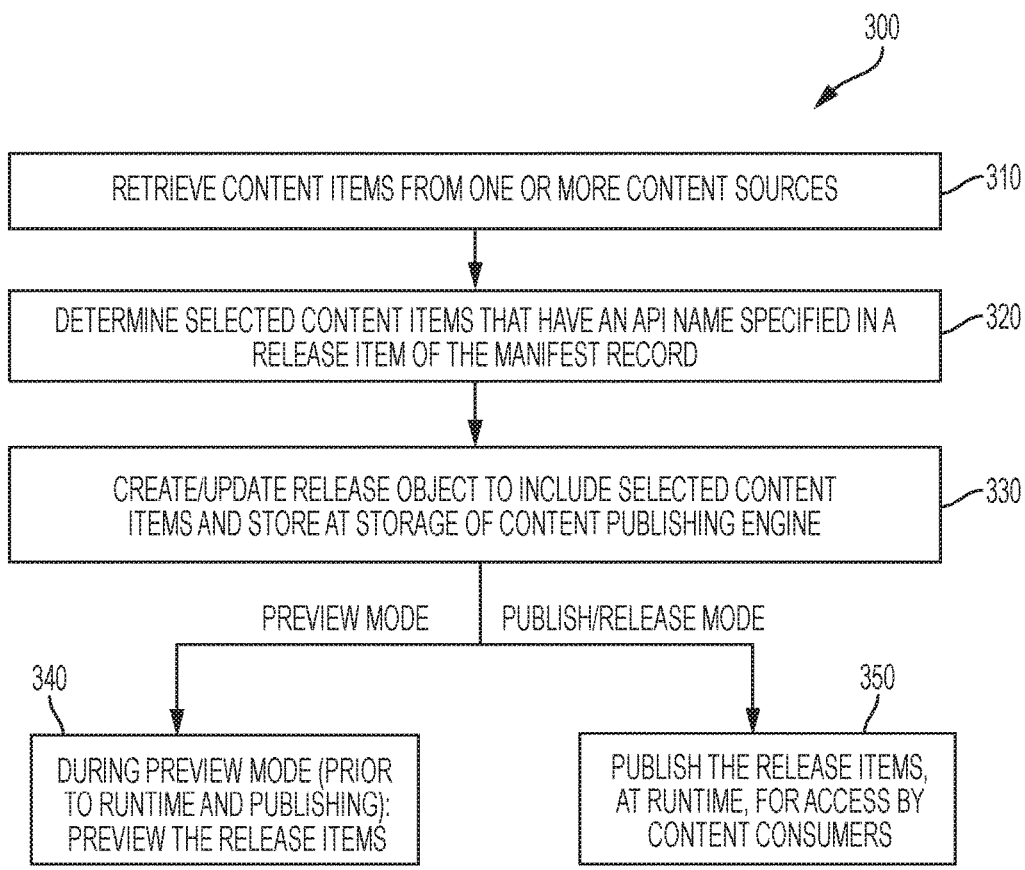
FIG. 3 is a flow chart that illustrates an exemplary content deployment method for automatically deploying content items associated with a specific release in accordance with the disclosed embodiments.

FIG. 3 is a flow chart that illustrates an exemplary content deployment method 300 for automatically deploying content items associated with a specific release in accordance with the disclosed embodiments. The method 300 will be described below with continued reference to FIGS. 1 and 2.

The method 300 begins at 310, when content items from one or more version control systems are retrieved and then received by the content publishing engine 104. At 320, the content publishing engine 104 can determine, based on a most current manifest record for the specific release, which of the content items have an API name that matches an API name of a release item that is specified in the manifest record, and can select those content items as "selected" content items for inclusion as part of a release object for the specific release. Each of the selected content items can be added, as appropriate, to a corresponding release item that has a matching API name.

At 330, a processor 106 of the content publishing engine 104 can create or update a release object for the specific release, and store the release object in storage 116. If the release object does not yet exist, then it is created. If the release object already exists it is updated. The release object includes the selected content items that have an API name that matches an API name of a release item that is specified in the manifest record (and are therefore to be included as part of the release object for that specific release). Each of the selected content items can be added, as appropriate, to a corresponding release item that has a matching API name. In addition, although not illustrated, other selected content items from other content package objects can also be added to the release object, and integrated into appropriate release items. The content publishing engine 104 can run other instance(s) of the method 300 in parallel such that the release object can be updated with selected content items from other content package objects that are compliant with the manifest record for that specific release (e.g., that have an API name that matches an API name of a release item that is specified in the most current manifest record for the specific release). Each of the other selected content items can be added, as appropriate, to a corresponding release item that has a matching API name During preview mode prior to runtime and publishing, the release items may be previewed at 340. As described above, during the preview mode, certain actions are permitted with respect to the release items, such as, validation of user activity with respect to the release items without persistence of user activity data.

At 350, the release items that are part of the specific release are published at runtime. Upon publication, the release items can be accessed by content consumers. As described above, during the publish-and-release mode other actions, other actions, that are different than the actions that are allowed in the preview mode, are permitted with respect to the release items.

In one embodiment that will now be described with reference to FIGS. 4 and 5, a content deployment method 400, 500 is provided that employs an enterprise proxy 134 for continuously identifying and providing selected content items from one or more version control systems 132 to the content publishing engine 104 for publication as part of a specific release.

Figure 4:
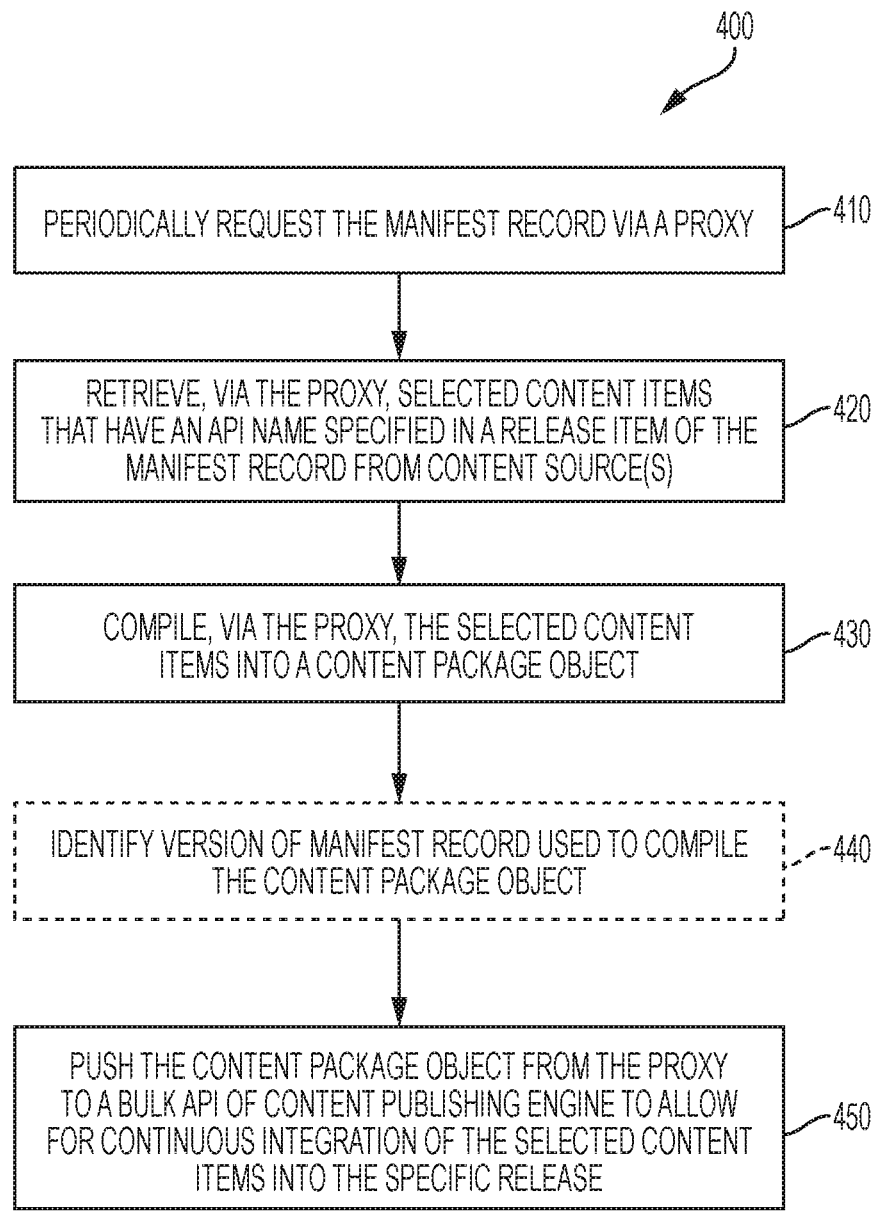
FIG. 4 is a flow chart that illustrates an exemplary method performed by a proxy for automatically retrieving content items for potential inclusion in a specific release and providing the retrieved content items to a content publishing engine in accordance with the disclosed embodiments.

FIG. 4 is a flow chart that illustrates an exemplary method 400 performed by a proxy for automatically retrieving content items for potential inclusion in a specific release and providing the retrieved content items to a content publishing engine 104 in accordance with the disclosed embodiments. The method 400 will be described below with continued reference to FIGS. 1 and 2.

At 410, a proxy 134 periodically requests a manifest record for the specific release from the release management API 110. In one embodiment, the proxy 134 can connect to the content publishing engine 104 on a scheduled basis and ask for any content for any releases where the status is open, and the content publishing engine 104 will return a set of open releases and a corresponding manifest record for each open release.

At 420, the proxy 134 periodically retrieves selected content items from a version control system. The selected content items are those content items that have an API name that matches an API name of a release item that is specified in a manifest record for a specific release. At 430, the proxy 134 compiles the selected content items into a content package object. For example, in one embodiment of 420, 430, the proxy 134 will parse the manifest record, connect to one or more version control system(s), and compile the content items that comply with the manifest record into one or more content package objects that it will submit to the content publishing engine 104 via the bulk API 112 for potential inclusion/insertion into a release object.

At optional step 440, the proxy 134 can include an identifier for the manifest record that was used to compile the content package object 108a. This step is optional and not performed in all implementations. When an identifier is included this can allow for the content publishing engine 104 to confirm that the manifest record is a most current version of the manifest record for a specific release (e.g., that the manifest record has not been modified or changed in some way since it was requested/retrieved by the proxy).

At 450, the proxy 134 pushes the content package object to a bulk API 112 of the content publishing engine 104 to allow for continuous integration of the selected content items into the specific release by the content publishing engine 104.

Figure 5:
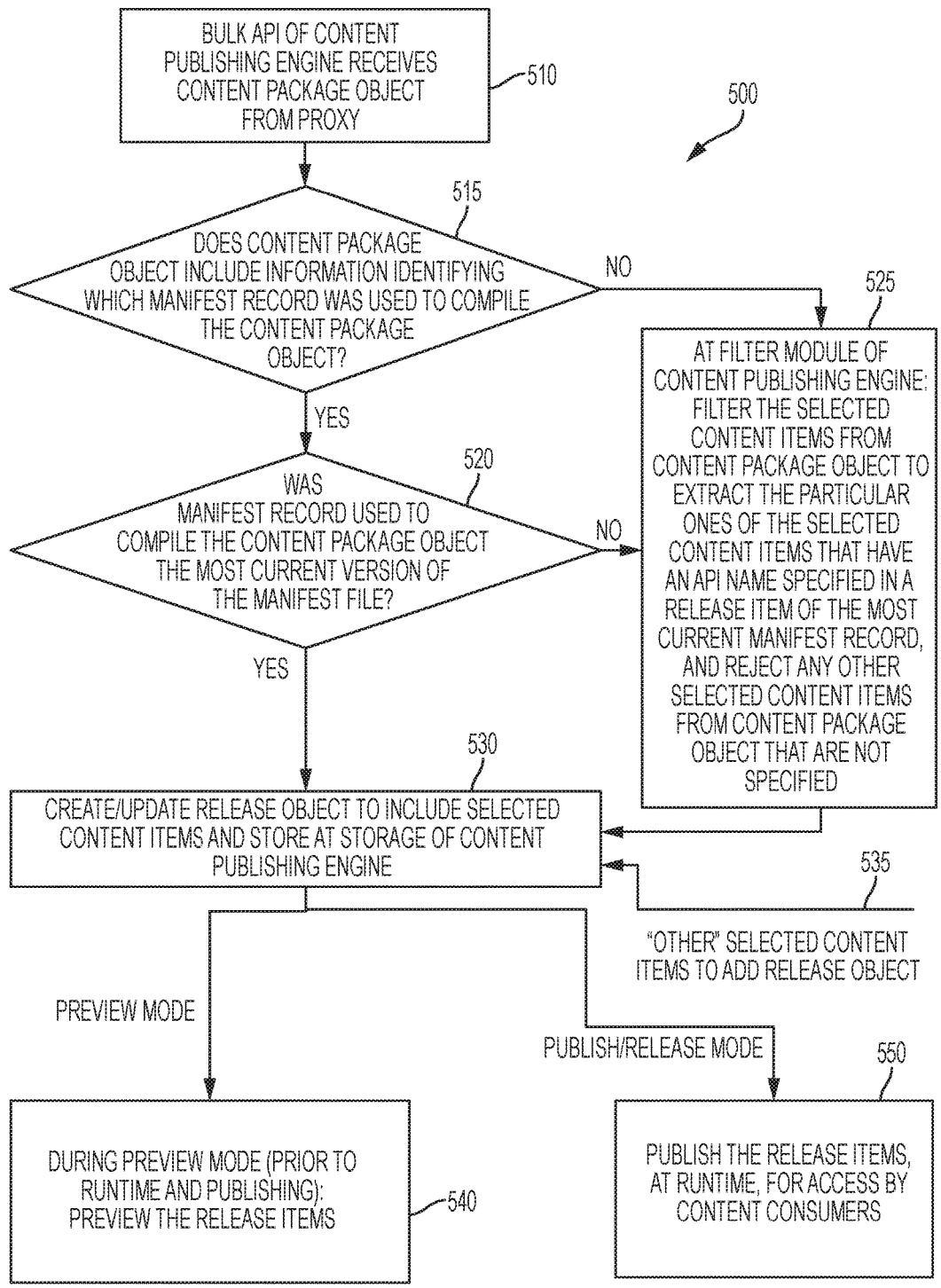
FIG. 5 is a flow chart that illustrates another exemplary content deployment method performed by the content publishing engine for continuously integrating content items into a specific release and automatically deploying the content items associated with the specific release in accordance with the disclosed embodiments.

FIG. 5 is a flow chart that illustrates another exemplary content deployment method 500 performed by the content publishing engine 104 for continuously integrating content items into a specific release and automatically deploying the content items associated with the specific release in accordance with the disclosed embodiments. The method 500 will be described below with continued reference to FIGS. 1, 2, and 4. As a preliminary matter, it should be noted that the method of FIG. 5 illustrates processing steps associated with a single content package object. However, the content publishing engine 104 can run other instance(s) of the method 500 and/or other instances of method 600 (FIG. 6) in parallel so that a release object can be updated with selected content items from other content package objects that are compliant with a manifest record for that specific release (e.g., that are specified in a most current manifest record for the specific release).

The method 500 begins at 510, when the bulk API 112 receives a content package object having selected content items extracted from one or more version control systems. At 515, the content publishing engine 104 can determine whether the proxy 134 provided an identifier for a manifest record that was used to compile the selected content items that are part of the content package object.

When the content publishing engine 104 determines (at 515) that the proxy 134 did not provide the identifier for the manifest record that was used to compile the selected content items that are part of the content package object, the method 500 proceeds to 525. When the content publishing engine 104 determines (at 515) that the proxy 134 did provide the identifier for the manifest record that was used to compile the selected content items that are part of the content package object, the method 500 proceeds to 520.

At 520, the content publishing engine 104 can determine, based on the identifier for the manifest record that was used to compile the selected content items that are part of the content package object, whether that identifier matches an identifier for a most current manifest record for the specific release. When the content publishing engine 104 determines (at 520) that the identifier does not match the identifier for the most current manifest record for the specific release, the method proceeds to 525. When the content publishing engine 104 determines (at 520) that the identifier does match the identifier for the most current manifest record for the specific release, the method proceeds to 530.

At 525, a filter module 114 of the content publishing engine 104 verifies, based on a most current manifest record for the specific release, whether each of the selected content items from the content package object have an API name that matches an API name of a release item that is specified in the most current manifest record. At 525, the selected content items from the content package object having an API name that matches an API name of a release item that is specified in the most current manifest record will be sent to 530 for inclusion as part of a release object for the specific release. Any of the selected content items from the content package object that are determined to have an API name that does not match an API name of a release item that is specified in the most current manifest record for the specific release will be rejected so that they are not included as part of the release object for the specific release.

At 530, a processor 106 of the content publishing engine 104 can create or update a release object, and store the release object into storage 116. If the release object does not yet exist, then it is created. If the release object already exists it is updated. The release object includes the selected content items from the content package object having an API name that matches an API name of a release item that is specified in the most current manifest record for the specific release, as well as selected content items from other content package object having API names that matches an API name of a release item that is specified in the most current manifest record for the specific release. Each of the selected content items can be added, as appropriate, to a corresponding release item that has a matching API name.

For example, when the content publishing engine 104 determines (at 520) that the identifier does match the identifier for the most current manifest record for the specific release (e.g., the identifier provided by the proxy 134 is the most current identifier), then at 530, the processor 106 of the content publishing engine 104 adds all of the selected content items from the content package object 108*b* to the release object (e.g., all of the content items from the content package object are integrated as part of the release object for the specific release without the need for filtering or further verification). In this case, because the proxy 134 has already filtered the selected content items, they are all eligible for inclusion in the release object, and no filtering needs to be performed at the content publication engine 104. By contrast, when the proxy 134 does not provide an identifier, or when the content publishing engine 104 determines that the identifier provided by the proxy 134 does not match the identifier for the most current manifest record for the specific release, filtering needs to be performed (at 525), and after filtering at 525, the processor 106 of the content publishing engine 104 can add each of the selected content items from the content package object that have been verified as being specified in the most current manifest record for the specific release, as part of the release object for the specific release.

As such, after any release has a status of open and a manifest record has been defined for that specific release, a release object for that specific release can be continuously updated based on content items being pushed into the content publishing engine 104 via the proxy 134.

At 535, other selected content items from other content package objects can also be added to the release object. As noted above, the content publishing engine 104 can run other instance(s) of the method 500 (or method 600 of FIG. 6) in parallel such that the release object can be updated with selected content items from other content package objects that are compliant with the manifest record for that specific release (e.g., that are specified in the most current manifest record for the specific release).

During preview mode prior to runtime and publishing, the release items of the release object may be previewed at 540. As described above, during the preview mode, certain actions are permitted with respect to the release items, such as, validation of user activity with respect to the release items without persistence of user activity data.

At 550, the release items that are part of the specific release are published at runtime. Upon publication, the release items can be accessed by content consumers. As described above, during the publish-and-release mode other actions, that are different than the actions that are allowed in the preview mode, are permitted with respect to the release items.

In another embodiment that will now be described with reference to FIG. 6, a content deployment method 600 is provided in which a filter module of a content publishing engine selectively extracts content items from content package object(s) that have been pushed to the content publishing engine from one or more version control systems for publication as part of a specific release. This embodiment can be implemented, for example, when a proxy 134 is not implemented or available for some reason. In this embodiment, version control systems (or other content sources) can push content items to content publishing engine 104, and the filer module can determine which content items should be included as part of a release object for a specific release and then include those selected content items in the specific release.

Figure 6:
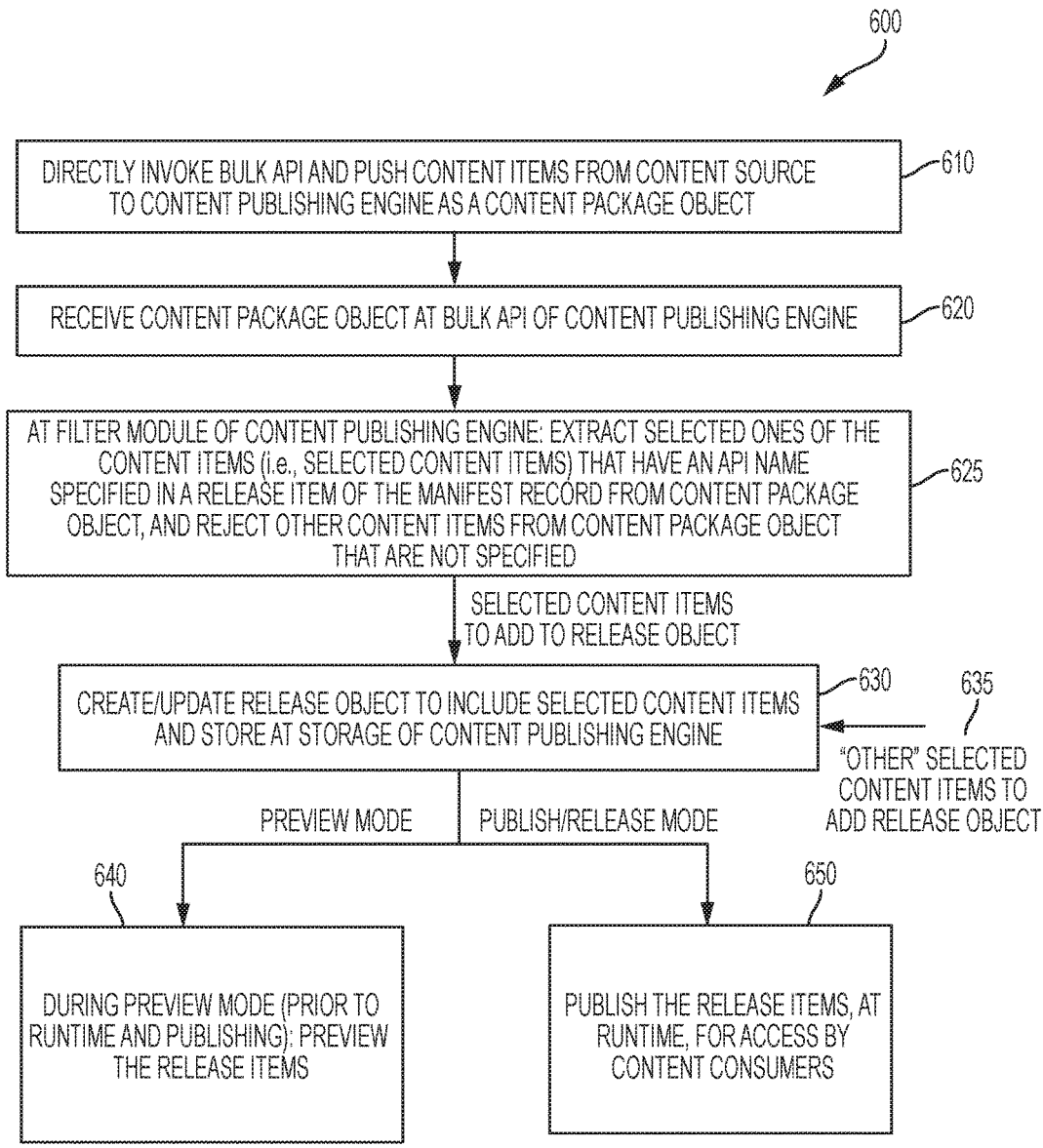
FIG. 6 is a flow chart that illustrates another exemplary content deployment method for pushing content items to a content publishing engine, automatically filtering selected ones of the content items associated with a specific release, and automatically deploying those content items associated with the specific release in accordance with the disclosed embodiments.

FIG. 6 is a flow chart that illustrates another exemplary content deployment method 600 for pushing content items to a content publishing engine 104, automatically filtering selected ones of the content items associated with a specific release, and automatically deploying those content items associated with the specific release in accordance with the disclosed embodiments. The method 600 will be described below with continued reference to FIGS. 1 and 2. As a preliminary matter, it should be noted that the method of FIG. 6 illustrates processing steps associated with a single content package object. However, the content publishing engine 104 can run other instance(s) of the method 600 and/or other instances of method 500 (FIG. 5) in parallel so that a release object can be updated with selected content items from other content package objects that are compliant with a manifest record for that specific release (e.g., that are specified in a most current manifest record for the specific release).

At 610, at least one version control system 132c, 132d directly invokes a bulk API 112 of the content publishing engine 104, and pushes a content package object 108b from the version control system to the bulk API 112. The content package object 108b comprises a plurality of content items. For sake of discussion, it is assumed that at least some of the content items are for inclusion in a release object of a specific release that is described in this example; however, it could be possibly that a particular content package object does not contain any content items that will be allowed for inclusion in a release object of a specific release. As noted above, the writers can specify each content item by an API name that serves as an identifier and can indicate content type. As will be explained below, any content items having an API name that matches an API name of a release item that is specified in the manifest record are permitted to be part of the specific release, and can be integrated into a release item of that specific release.

At 620, the bulk API 112 receives the content package object 108b, and determines that it must be filtered. This determination can be based on an explicit indication in the content package object, or absence of information such as an identifier that identifies a manifest record that was used to compile the content package object.

At 625, a filter module 114 of the content publishing engine 104 processes the content package object 108b (along with other content package objects from other sources). When processing the content package object 108b, the filter module 114 filters the content items that are included in the content package object 108b to extract selected ones of the content items that have an API name that matches an API name of a release item that is specified in the manifest record, and can select those content items as "selected" content items for inclusion as part of a release object for the specific release. Any content items that have an API name that does not match an API name of a release item that is specified in the manifest record for the specific release are rejected, and those rejected content items are not included in the release object for the specific release (and hence not published at runtime for access by the content consumers).

At 630, a processor 106 of the content publishing engine 104 automatically creates or updates a release object for the specific release such that the selected content items that are extracted by the filter module 114 (at 625) are added to the release object, and stores the release object at storage 116.

As such, the release object includes the selected ones of the content items (extracted by filter module 114) that are to be included as part of the specific release. Each of the selected content items can be added, as appropriate, to a corresponding release item of the release object that has a matching API name.

At 635, other selected content items from other content package objects can also be added to the release object. The other content package objects can be provided from other content sources, such as, different version control systems. As noted above, the content publishing engine 104 can run other instance(s) of the method 500 of FIG. 5 or other instance(s) of the method 600 in parallel such that the release object can also be updated (or created) with selected content items from other content package objects that are compliant with the manifest record for that specific release (e.g., that are specified in the most current manifest record for the specific release). Again, each of the other selected content items can be added, as appropriate, to a corresponding release item that has a matching API name.

During preview mode prior to runtime and publishing, the release items may be previewed at 640. As described above, during the preview mode, certain actions are permitted with respect to the release items, such as, validation of user activity with respect to the release items without persistence of user activity data.

At 650, the release items that are part of the specific release are published at runtime. Upon publication, the release items can be accessed by content consumers. As described above, during the publish-and-release mode other actions, that are different than the actions that are allowed in the preview mode, are permitted with respect to the release items.

Figure 7:
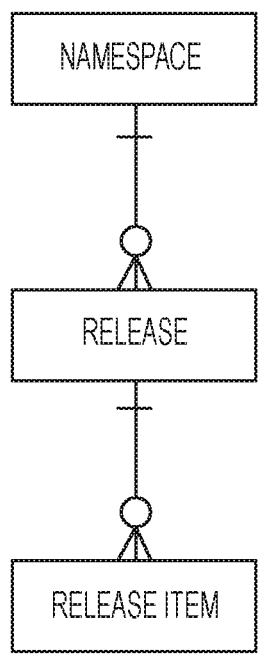
FIG. 7 is a diagram that illustrates a hierarchical structure of, releases, and a namespace, releases, and release items specified in manifest record in accordance with the disclosed embodiments.

FIG. 7 is a diagram that illustrates a hierarchical structure of, releases, and a namespace, releases, and release items specified in manifest record in accordance with the disclosed embodiments.

A namespace is managed by a release manager 102e. Each namespace can be based on a logical grouping, whether it be by team, region, company, or any other logical segmentation, all content and access can be bound to only that namespace. A use case is for a release manager 102e to manage all of the releases for the public namespace as well as the talent development namespace. Each namespace may have their own release schedule but may be managed by the same person or by different people as the organizational process dictates. Namspacing gives a release manager 102e the ability to specify the purpose of the release whether it is a major, minor, maintenance, or hotfix. A use case for this is for the release manager 102e to quickly create a hotfix release when a significant issue is encountered in the content. In some implementations, release objects can be associated with namespaces, e.g., a URL unique to the release object. In one example, a namespace might be "https://trailhead.sfdc.com/secure/org62/." In another example, there may be unique namespaces for different teams of an organization. In this example, Company A might have three different teams Team 1, Team 2, and Team 3. As such, Team 1 would have a namespace of "https://trailhead.sfdc.com/Company_A_Team_1/," Team 2 would have a namespace of https://trailhead.sfdc.com/Company_A_Team_2/, and Team 3 would have a namespace of "https://trailhead.sfdc.com/Company_A_Team_3/." Each team may have their own namespace as well as their own set of releases. For example, a new release for Team 1 can be https://trailhead.sfdc.com/Company_A_Team 1/R 17/Also or alternatively, namespaces can be further arranged according to different criteria, for instance, department, user roles, user, etc. Namespaces can also be utilized to enable each team to have several release cycles, e.g., /R17/, /R18/, /R19/, etc.

Within a particular namespace, multiple releases can be defined by the release manager 102e. Each release is a top-level object within a namespace. As noted above, for each release, a manifest record can be defined that includes one or more release items, where each release item has a particular API name.

As also described above, any number of content writers can each define any number of content items by API name. As such, when a particular release is built, the content publishing engine 104 can associate any content items from any number of content package objects with a particular manifest. Any content items that have an API name that matches one of the API names specified by particular manifest record can be integrated into the release object as part of that particular release for that manifest record.

The following description is of one example of a system in which the features described above may be implemented. The components of the system described below are merely one example and should not be construed as limiting. The features described above with respect to FIGS. 1-7 may be implemented in any other type of computing environment, such as one with multiple servers, one with a single server, a multi-tenant server environment, a single-tenant server environment, or some combination of the above. In the examples that follow, the content deployment system can be implemented in the context of a cloud-based system. Although the embodiments described herein can be implemented in the context of any cloud-based computing environment including, for example, a multi-tenant database system, it should be appreciated that this environment is non-limiting and that the disclosed embodiments can also be applied in the context of other non-cloud-based calendar applications and systems. In some implementations, the content publishing engine 104 of the disclosed embodiments can be implemented within or in conjunction with a multi-tenant architecture such as those that will be described below with reference to FIGS. 8-10B. When the disclosed embodiments are implemented in a multi-tenant system, tenancy follows the content meaning that the content is tagged by tenant or namespace and the behaviors with respect to the content convert around metadata, structure, and content capabilities. Each release is parented by a namespace like an organization and only users from that organization may view the content. Release items can be added into a namespace A, but if there is no access to namespace B, then release items cannot be added into that particular release.

Figure 8:
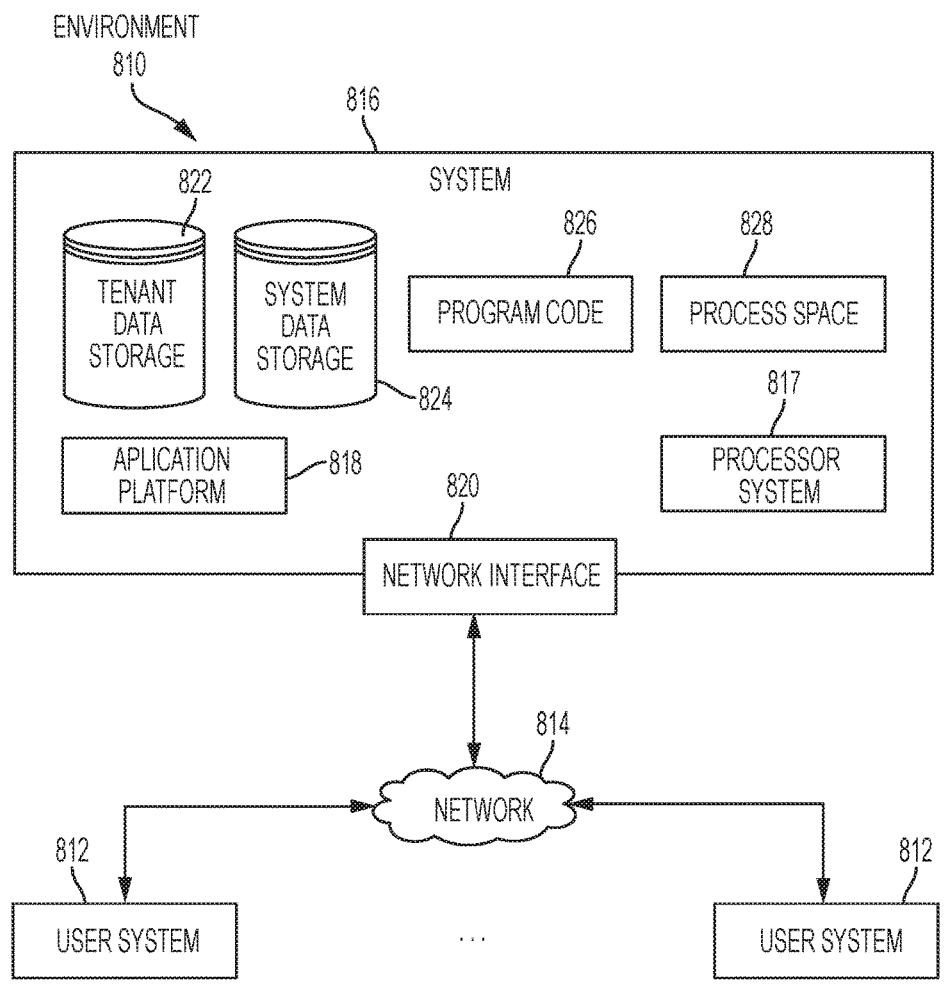
FIG. 8 shows a block diagram of an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
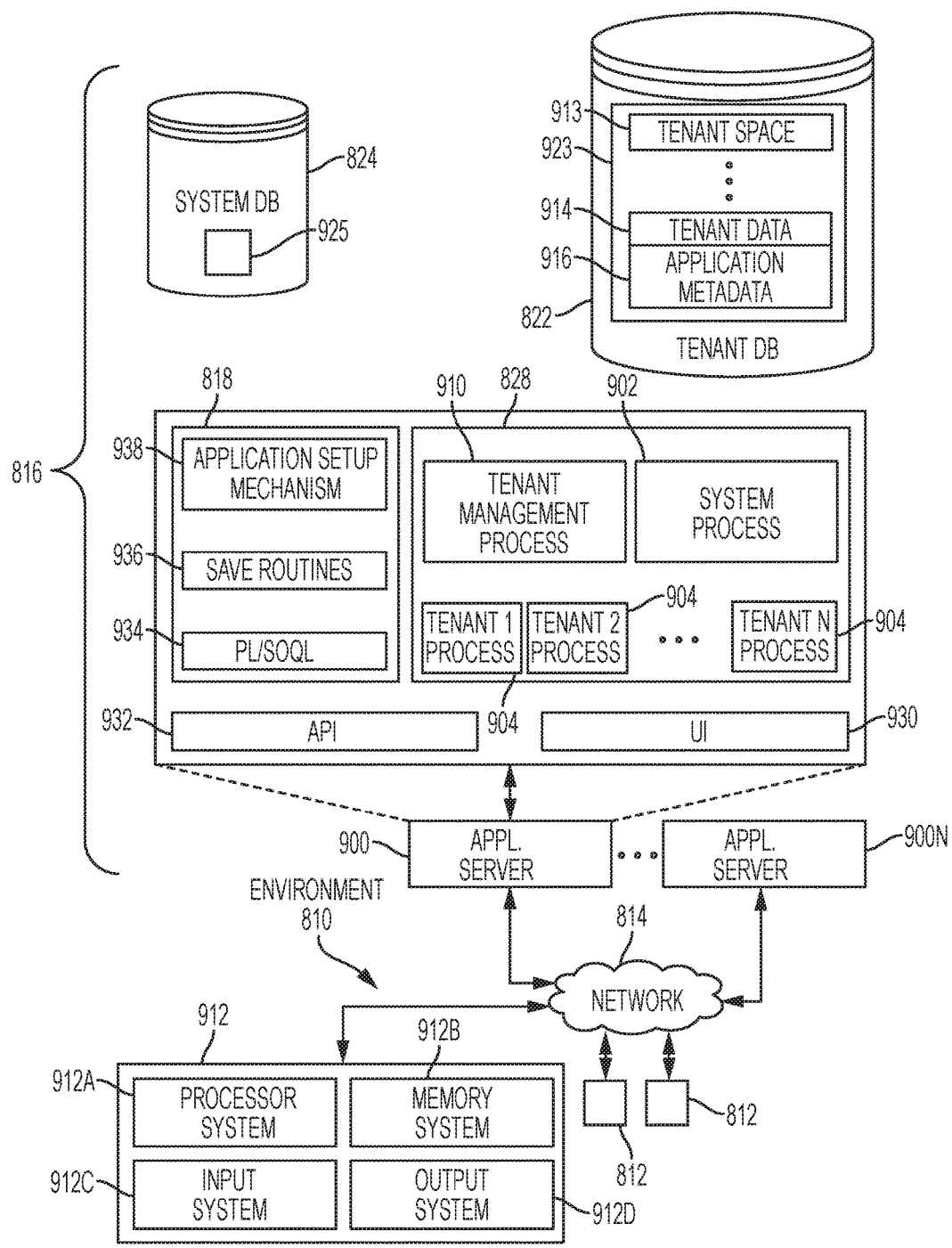
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server $900_1$ can be coupled via the network 814 (for example, the Internet), another application server $900_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
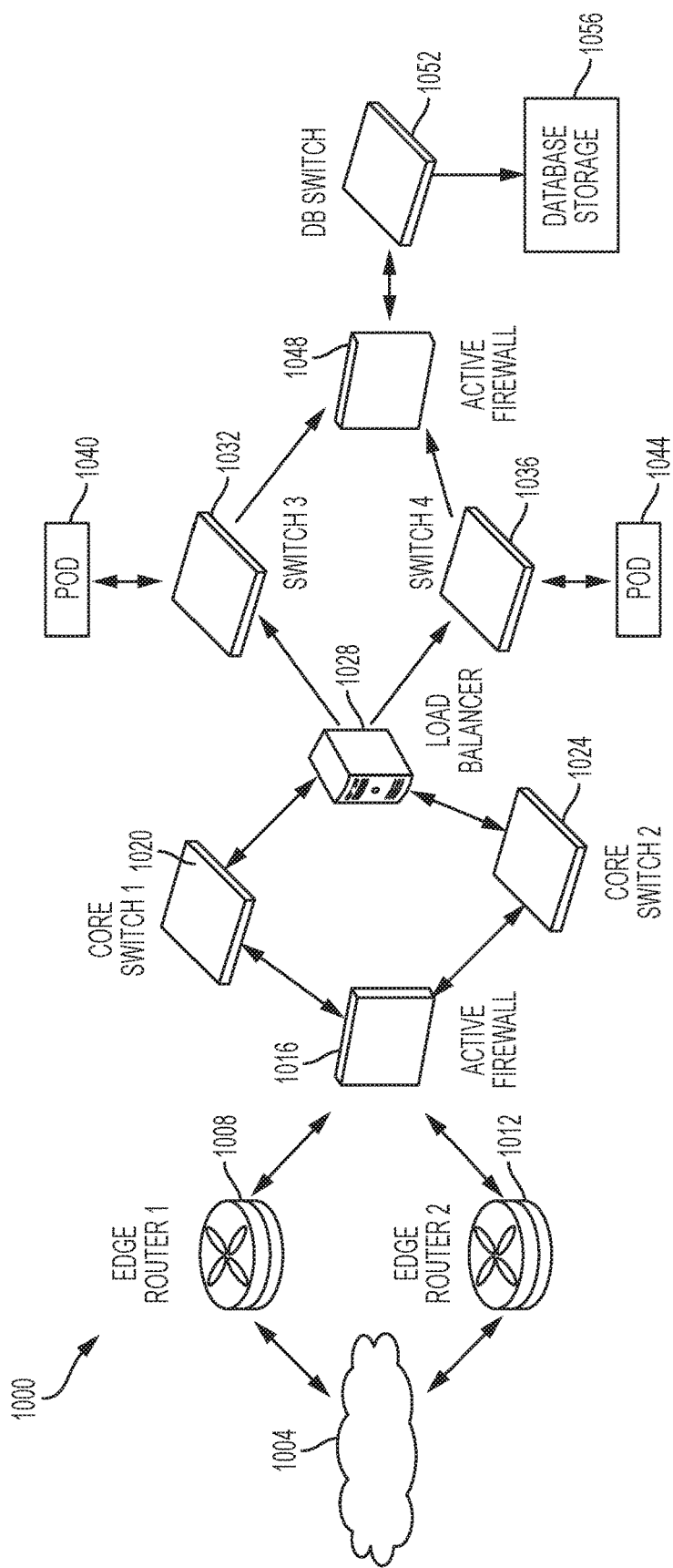
FIG. 10A shows a system diagram illustrating example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
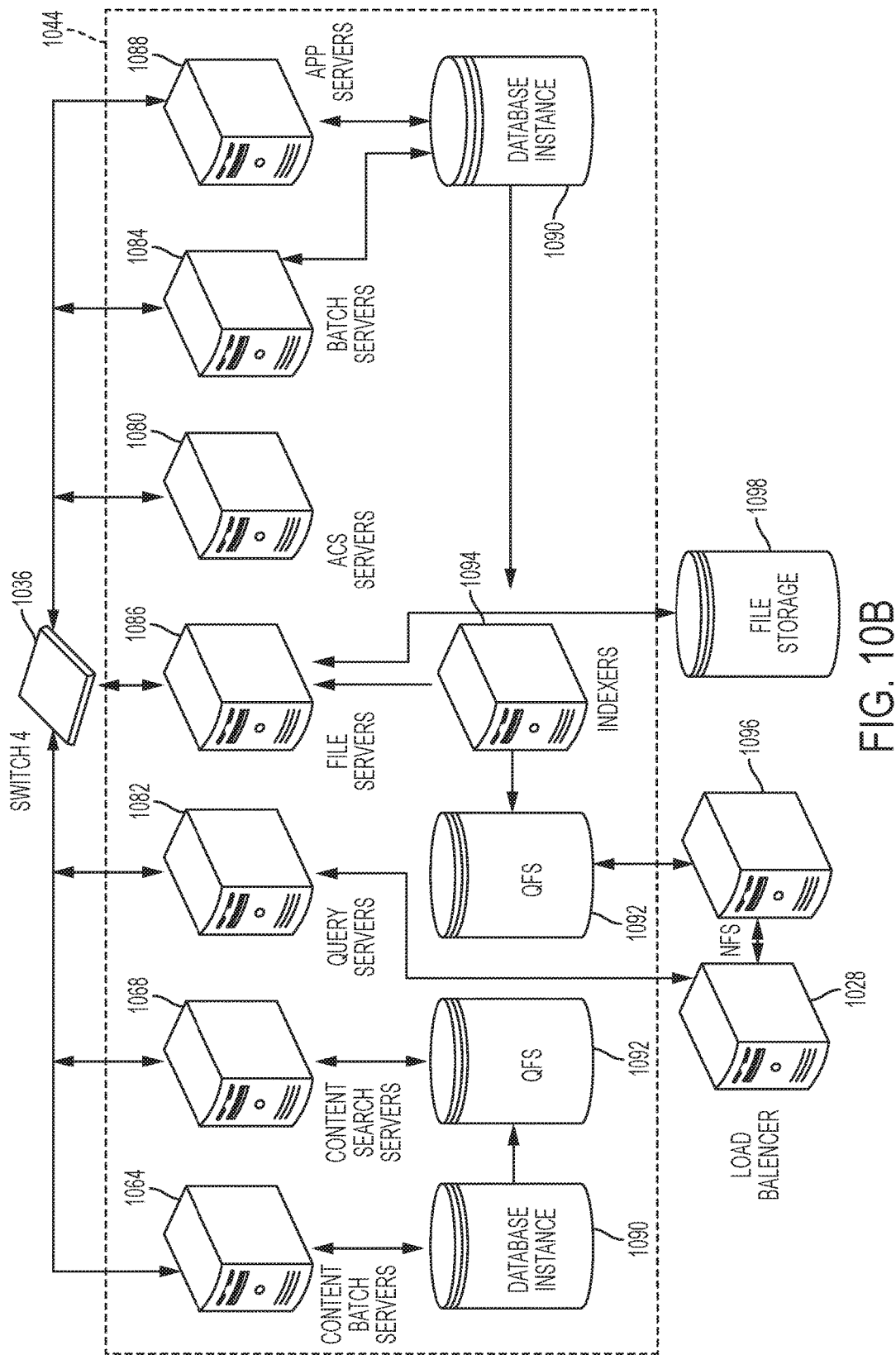
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
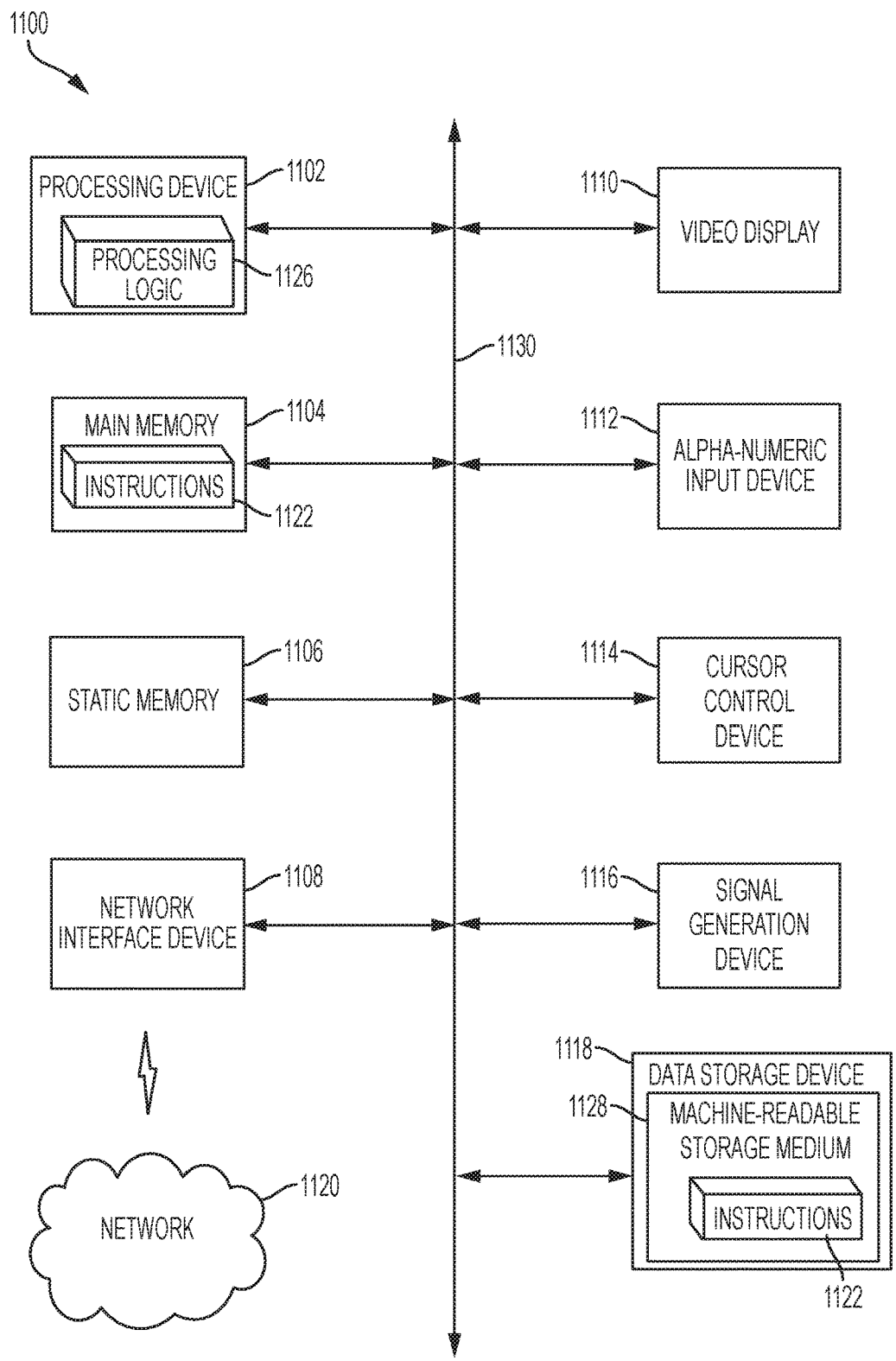
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A content deployment system for integrating and deploying selected content items into a specific release of a webpage in a content publishing process, the content deployment system comprising:

a plurality of content sources that are each configured to manage or store content items for potential inclusion in the specific release of the webpage, wherein each content item comprises: at least one of a set of directions for rendering the webpage and actual content that is rendered on the webpage, and wherein the plurality of content sources comprise:

a first content source that is configured to manage and store a plurality of first content items for potential inclusion in the specific release of the webpage;

a content publishing engine that is configurable to control the release of content items that are to be published, comprising:

a processor configured to execute:

a release management interface that, when executed by the processor, is configurable to manage and store a manifest record for the specific release of the webpage, wherein the manifest record specifies release items by interface name that are allowed to be part of the specific release of the webpage;

a bulk interface that, when executed by the processor, is configurable to receive content package objects from the plurality of content sources, wherein the first content source is further configured to: directly invoke the bulk interface to send the plurality of first content items to the content publishing engine; and a filter module that, when executed by the processor, is configurable to: process the first content items to extract selected first content items, from the plurality of first content items, that are specified in the manifest record for inclusion in the specific release of the webpage; and add the selected first content items into a release object so that the selected first content items are included as part of the specific release of the webpage and published as web content.

2. The content deployment system according to claim 1, wherein the content publishing engine further comprises:

storage configured to: store content items created by writers and metadata that describes the content and interactive activities as objects, and wherein the processor of the content publishing engine is further configurable to:

add the release object into the storage;

allow previewing of release items of the release object during the preview mode; and publish, at runtime, the release items for access.

3. The content deployment system according to claim 2, wherein the preview mode occurs prior to runtime and publishing,
 wherein a first set of actions are permitted with respect to the release items during preview mode, and
 wherein a second set of actions, that are different than the first set of actions, are permitted with respect to the release items during the publish-and-release mode.

4. The content deployment system according to claim 1, wherein the release manager defines, in the manifest record, an interface name for each release item that is allowed to be included as part of the specific release of the webpage, and
 wherein writers specify each content item by an interface name that serves as an identifier and indicates content type, and wherein content items having an interface name that matches an interface name of a release item defined in the manifest record are permitted to be part of the specific release of the webpage, and wherein each of the selected first content items are integrated into one of the release items defined in the manifest record.

5. The content deployment system according to claim 1, wherein the content source pushes the first content package object to the bulk interface of the content publishing engine, and wherein the filter module automatically adds the selected first content items into the release object without requiring a release manager to determine which ones of the first content items will be included as part of the specific release of the webpage.

6. The content deployment system according to claim 1, wherein the plurality of content sources further comprises:
 a second content source that is configured to manage and store a plurality of second content items for potential inclusion in the specific release of the webpage;
 a third content source that is configured to manage and store a plurality of third content items for potential inclusion in the specific release of the webpage; and
 a proxy, associated with an enterprise database system, that is configurable to:
  periodically request the manifest record for the specific release of the webpage from the release management interface;
  periodically retrieve, from the second content source based on the manifest record, selected second content items that are specified in the manifest record for inclusion in the specific release of the webpage;
  periodically retrieve, from the third content source, selected ones the plurality of third content items that are specified in the manifest record for inclusion in the specific release of the webpage;
  collect the selected second content items and the selected third content items into a second content package object; and
  push the second content package object to the bulk interface to allow for continuous integration of the selected second content items and the selected third content items into the specific release of the webpage.

7. The content deployment system according to claim 1, wherein the selected first content items included in the first content package object by the content source each have an interface name that matches an interface name of a release item defined in the manifest record are included in a release object for the specific release of the webpage, and wherein others of the plurality of first content items included in the first content package object by the content source each have an interface name that that does not match an interface name of a release item defined in the manifest record and are not included in the release object for the specific release of the webpage.

8. The content deployment system according to claim 6, further comprising:
 a fourth content source that is configured to:
  manage and store a plurality of fourth content items for potential inclusion in the specific release of the webpage, wherein access to content items stored at the fourth content source is secured by another enterprise firewall; and
  directly invoke the bulk interface to send the plurality of fourth content items to the content publishing engine, and
 wherein the filter module is further configured to:
  process the fourth content items to extract selected fourth content items, from the plurality of fourth content items, that are specified in the manifest record for inclusion in the specific release of the webpage; and
  add the selected fourth content items into the release object so that the selected fourth content items are included as part of the specific release of the webpage.

9. The content deployment system according to claim 1, wherein the filter module, when executed by the processor, is further configurable to:
 reject any content items that are not specified in the manifest record such that those rejected content items are not included in the release object for the specific release of the webpage and not published at runtime.

10. The content deployment system according to claim 1, wherein a user interface for interacting with each manifest record includes a plurality of configurable settings comprising:
 a remove setting that is configurable to remove release items from the manifest record for the specific release of the webpage so that any removed release item will no longer be included as part of that specific release of the webpage;
 a modify setting that is configurable to change properties of a release object or a particular release item of the release object that is associated with a specific manifest record;
 a move setting that is configurable to specify a manifest record and a particular release item, wherein changing the manifest record of the move setting moves a release item of the manifest record from the specific release of the webpage to another manifest record of another specific release that is open in the same namespace; and
 a retire setting that is configurable to retire any release item from the specific release of the webpage so that any retired release item remains in the manifest record as part of the specific release and is hidden from view when published at run time.

11. The content deployment system according to claim 1, wherein the release object comprises a plurality of release items, and wherein the release management interface, when executed by the processor, is further configurable to:
 store, for each release item in the specific release of the webpage, reference information comprising: build status information that indicates when that release item was last successfully released.

12. The content deployment system according to claim 11, wherein the reference information further comprises any errors associated with that release item when that release item was not successfully released.

13. A content deployment method for integrating and deploying selected content items into a specific release of a webpage in a content publishing process, the content deployment method comprising:

creating the specific release of the webpage, based on input from a release manager, at a release management interface of a content publishing engine that is configurable to control the release of content;

defining, based on other input from the release manager at the release management interface, a manifest record that specifies release items by interface name that are allowed to be part of the specific release of the webpage;

invoking a bulk interface of the content publishing engine via a content source;

pushing a first content package object from the content source to the bulk interface, wherein the first content package object comprises a plurality of first content items, wherein each of the first content items comprises: at least one of a set of directions for rendering a webpage and actual content that is rendered on the webpage;

extracting, at a filter module of the content publishing engine when executed by a processor, selected first content items from first content package object, wherein the selected first content items are specified in the manifest record for inclusion in the specific release of the webpage; and creating a release object at the content publishing engine when executed by the processor, wherein the release object comprises at least one release item that is part of the specific release of the webpage, wherein the at least one release item includes at least one of the selected first content items from the first content package object that are to be included as part of the specific release of the webpage and published as web content.

14. A content deployment method according to claim 13, wherein the release object comprises a plurality of release items, and the method further comprising:

storing the release object at storage that is configured to: store content items created by writers and metadata that describes the content and interactive activities as objects;

previewing, during preview mode prior to runtime and publishing, the release items, wherein a first set of actions are permitted with respect to the release items during preview mode; and publishing, at runtime, the release items that are part of the specific release of the webpage, wherein a second set of actions, that are different than the first set of actions, are permitted with respect to the release items during the publish-and-release mode.

15. The content deployment method according to claim 13, wherein the release manager defines, in the manifest record, an interface name for each release item that is allowed to be included as part of the specific release of the webpage, and wherein writers specify each content item by an interface name that serves as an identifier and indicates content type, and wherein content items having an interface name that matches an interface name of a release item defined in the manifest record are permitted to be part of the specific release of the webpage, and wherein each of the selected first content items are integrated into one of the release items defined in the manifest record.

16. The content deployment method according to claim 13, wherein the first content source pushes the first content package object to the bulk interface of the content publishing engine, and wherein the filter module, when executed by the processor, is further configurable to cause:

automatic adding of the selected first content items into the release object without requiring a release manager to determine which of the first content items will be included as part of the specific release of the webpage.

17. The content deployment method according to claim 13, wherein others of the plurality of first content items included in the first content package object that have an interface name that does not match an interface name of a release item defined in the manifest record are not permitted to be part of the specific release of the webpage and are integrated into one of the release items defined in the manifest record.

18. The content deployment method according to claim 13, wherein the first content package object comprises the plurality of first content items and a plurality of second content items provided from a second content source, wherein access to content items stored at the second content source is secured by an enterprise firewall, further comprising:

wherein extracting comprises:

extracting, at the filter module of the content publishing engine when executed by the processor, selected first content items and other selected second content items from first content package object, wherein the selected first content items and the other selected second content items are specified in the manifest record; and wherein creating comprises:

creating the release object at the content publishing engine when executed by the processor, wherein the release object comprises the selected first content items and the other selected second content items that are to be included as part of the specific release of the webpage.

19. The content deployment method according to claim 13, wherein the filter module, when executed by the processor, is further configurable to cause:

rejecting any content items that are not specified in the manifest record such that those rejected content items are not included in the release object for the specific release of the webpage and not published at runtime.

20. The content deployment method according to claim 13, wherein the release object comprises a plurality of release items, and wherein the release management interface, when executed by the processor, is further configurable to cause:

storing, for each release item in the specific release of the webpage, reference information comprising: build status information that indicates when that release item was last successfully released.

* * * * *